(12) United States Patent
VanWinckle et al.

(10) Patent No.: US 8,650,088 B2
(45) Date of Patent: Feb. 11, 2014

(54) METHODS AND SYSTEM FOR MANAGING CREDIT CARD USAGE IN PRE-PAID PRINTING SYSTEM ACCOUNTS

(75) Inventors: James Patrick VanWinckle, West Linn, OR (US); Charles Robert Carlson, Beaverton, OR (US); Peter Charles Rapley, Portland, OR (US); Shanti Villarreal, Willsonville, OR (US); Christopher Dale Iburg, Government Camp, OR (US); Sara Kleiman, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 345 days.

(21) Appl. No.: 12/696,076

(22) Filed: Jan. 29, 2010

(65) Prior Publication Data
US 2011/0191197 A1 Aug. 4, 2011

(51) Int. Cl.
*G06Q 30/00* (2012.01)

(52) U.S. Cl.
USPC .............. 705/26.1; 705/30; 705/44; 705/400; 705/403; 358/1.14; 399/79

(58) Field of Classification Search
USPC ................................................ 705/26.1, 400
See application file for complete search history.

(56) References Cited

U.S. PATENT DOCUMENTS

| 5,146,344 | A | 9/1992 | Bennett et al. |
| 5,563,999 | A | 10/1996 | Yaksich et al. |
| 6,076,076 | A | 6/2000 | Gottfreid |
| 6,202,155 | B1 | 3/2001 | Tushie et al. |
| 6,357,942 | B1 | 3/2002 | Adkins et al. |
| 6,373,587 | B1 | 4/2002 | Sansone |
| 6,452,512 | B1 | 9/2002 | Adkins et al. |
| 6,471,319 | B1 | 10/2002 | Adkins et al. |
| 6,523,924 | B1 | 2/2003 | Adkins et al. |
| 6,525,837 | B1 | 2/2003 | Adkins et al. |
| 6,567,015 | B2 | 5/2003 | Adkins et al. |
| 6,600,150 | B1 | 7/2003 | Adkins et al. |
| 6,600,151 | B2 | 7/2003 | Chapman et al. |
| 6,609,781 | B2 | 8/2003 | Adkins et al. |
| 6,616,261 | B2 | 9/2003 | Adkins et al. |
| 6,624,407 | B1 | 9/2003 | Adkins et al. |
| 6,626,513 | B2 | 9/2003 | Adkins et al. |
| 6,631,971 | B2 | 10/2003 | Adkins et al. |
| 6,637,961 | B1 | 10/2003 | Adkins et al. |
| 6,655,777 | B2 | 12/2003 | Adkins et al. |

(Continued)

FOREIGN PATENT DOCUMENTS

JP 2002215374 8/2002
WO 0102946 A1 1/2001

OTHER PUBLICATIONS

U.S. Appl. No. 12/364,224, filed Aug. 5, 2010, Tredoux et al.

(Continued)

*Primary Examiner* — Bradley B. Bayat
(74) *Attorney, Agent, or Firm* — Fay Sharpe LLP

(57) ABSTRACT

Methods and systems are presented for managing prepaid usage of document processing devices, in which an account manager system (104) automatically purchases prepaid account credits for customer accounts and applies print units to document processing devices registered to customer accounts periodically and according to preset top off thresholds (123, 128) subject to predefined limits (124, 129), and in which customer computer agents (360) allow just in time printing using devices with job-based application of print units to selected devices.

20 Claims, 13 Drawing Sheets

(56) References Cited

U.S. PATENT DOCUMENTS

| | | |
|---|---|---|
| 6,660,996 B1 | 12/2003 | Adkins et al. |
| 6,763,336 B1 | 7/2004 | Kolls |
| 6,768,427 B1 | 7/2004 | Adkins et al. |
| 6,768,558 B1 | 7/2004 | Adkins et al. |
| 6,823,133 B1 | 11/2004 | Adkins et al. |
| 6,826,547 B1 | 11/2004 | Silverbrook et al. |
| 6,830,399 B2 | 12/2004 | Adkins et al. |
| 6,843,547 B2 | 1/2005 | Adkins et al. |
| 6,865,241 B1 | 3/2005 | Adkins et al. |
| 6,871,926 B2 | 3/2005 | Adkins et al. |
| 6,873,424 B2 | 3/2005 | Jakobsson et al. |
| 6,917,440 B2 | 7/2005 | Kondo |
| 6,940,613 B1 | 9/2005 | Beard et al. |
| 6,940,913 B2 | 9/2005 | Verbin et al. |
| 6,957,921 B1 | 10/2005 | Silverbrook et al. |
| 6,963,820 B2 | 11/2005 | Adkins et al. |
| 6,965,439 B1 | 11/2005 | Silverbrook et al. |
| 6,976,798 B2 | 12/2005 | Keane et al. |
| 7,050,726 B2 | 5/2006 | Adkins et al. |
| 7,134,594 B2 | 11/2006 | Thompson et al. |
| 7,146,114 B2 | 12/2006 | Frankel et al. |
| 7,163,273 B2 | 1/2007 | Silverbrook |
| 7,216,951 B2 | 5/2007 | Garrana et al. |
| 7,240,995 B2 | 7/2007 | Adkins et al. |
| 7,280,772 B2 | 10/2007 | Adkins et al. |
| 7,369,782 B2 | 5/2008 | Adkins et al. |
| 7,376,627 B2 | 5/2008 | Adkins et al. |
| 7,430,605 B2 | 9/2008 | Quach et al. |
| 7,469,107 B2 | 12/2008 | Adkins et al. |
| 7,585,043 B2 | 9/2009 | Adkins et al. |
| 7,589,850 B2 | 9/2009 | Adkins et al. |
| 7,684,072 B2 * | 3/2010 | Ebihara ................ 358/1.15 |
| 7,689,513 B2 | 3/2010 | Adkins et al. |
| 7,739,198 B2 | 6/2010 | Adkins et al. |
| 7,788,490 B2 | 8/2010 | Adkins et al. |
| 7,792,992 B2 | 9/2010 | Gnanasambandam et al. |
| 7,798,594 B2 | 9/2010 | Adkins et al. |
| 7,859,412 B2 | 12/2010 | Kothari et al. |
| 8,174,714 B2 | 5/2012 | Watanabe |
| 2002/0039193 A1 | 4/2002 | Kondo et al. |
| 2002/0049638 A1 | 4/2002 | Ito |
| 2002/0073002 A1 | 6/2002 | Horii et al. |
| 2002/0131079 A1 * | 9/2002 | Forbes et al. ................ 358/1.15 |
| 2002/0135624 A1 | 9/2002 | Naka et al. |
| 2002/0194064 A1 | 12/2002 | Parry et al. |
| 2003/0065713 A1 | 4/2003 | Quach et al. |
| 2003/0090705 A1 | 5/2003 | Ferlitsch |
| 2003/0098993 A1 | 5/2003 | Ohara |
| 2003/0115156 A1 | 6/2003 | Baker |
| 2003/0137549 A1 | 7/2003 | Adkins et al. |
| 2003/0151762 A1 | 8/2003 | Cherry et al. |
| 2004/0008371 A1 | 1/2004 | Keane et al. |
| 2004/0012644 A1 | 1/2004 | Allen et al. |
| 2004/0125397 A1 | 7/2004 | Adkins et al. |
| 2004/0153415 A1 | 8/2004 | Adkins et al. |
| 2004/0179885 A1 | 9/2004 | Adkins et al. |
| 2004/0190014 A1 | 9/2004 | Ferlitsch |
| 2004/0207668 A1 | 10/2004 | Adkins et al. |
| 2004/0215577 A1 | 10/2004 | Mitsuda |
| 2004/0236705 A1 | 11/2004 | Shima et al. |
| 2004/0249733 A1 | 12/2004 | Clough et al. |
| 2005/0091343 A1 | 4/2005 | Murray, Jr. |
| 2005/0162677 A1 | 7/2005 | Toumanova et al. |
| 2005/0206672 A1 | 9/2005 | Adkins et al. |
| 2005/0273403 A1 | 12/2005 | Nguyen et al. |
| 2005/0286913 A1 | 12/2005 | Adkins et al. |
| 2006/0004672 A1 | 1/2006 | Leute |
| 2006/0020561 A1 | 1/2006 | Kodimer et al. |
| 2006/0044590 A1 | 3/2006 | Ferlitsch et al. |
| 2006/0056856 A1 | 3/2006 | Adkins et al. |
| 2006/0065715 A1 | 3/2006 | Kojima et al. |
| 2006/0069647 A1 | 3/2006 | Cozian et al. |
| 2006/0095280 A1 | 5/2006 | Gooding |
| 2006/0120735 A1 | 6/2006 | Adkins et al. |
| 2006/0140647 A1 | 6/2006 | Adkins et al. |
| 2006/0149690 A1 * | 7/2006 | Lau et al. ................ 705/403 |
| 2006/0190324 A1 | 8/2006 | Adkins et al. |
| 2006/0200735 A1 | 9/2006 | Ormond |
| 2006/0224889 A1 | 10/2006 | Adkins et al. |
| 2006/0233562 A1 | 10/2006 | Zwiefelhofer |
| 2006/0259983 A1 | 11/2006 | Sperry |
| 2006/0290973 A1 | 12/2006 | Inouye et al. |
| 2007/0027990 A1 | 2/2007 | Nakaoka et al. |
| 2007/0035762 A1 | 2/2007 | Wilsher et al. |
| 2007/0035763 A1 | 2/2007 | Bard et al. |
| 2007/0057982 A1 | 3/2007 | Adkins et al. |
| 2007/0061268 A1 | 3/2007 | Herold et al. |
| 2007/0075137 A1 | 4/2007 | Adkins et al. |
| 2007/0077074 A1 | 4/2007 | Adkins et al. |
| 2007/0079125 A1 | 4/2007 | Adkins et al. |
| 2007/0088613 A1 | 4/2007 | Adkins et al. |
| 2007/0094148 A1 | 4/2007 | Adkins et al. |
| 2007/0156523 A1 | 7/2007 | Liu et al. |
| 2007/0174218 A1 | 7/2007 | Kojima et al. |
| 2007/0182984 A1 * | 8/2007 | Ragnet et al. ................ 358/1.15 |
| 2007/0188530 A1 | 8/2007 | Garrana et al. |
| 2008/0010211 A1 | 1/2008 | Ferraro |
| 2008/0027875 A1 | 1/2008 | Adkins et al. |
| 2008/0065477 A1 | 3/2008 | Korhonen |
| 2008/0071626 A1 | 3/2008 | Hill |
| 2008/0079989 A1 | 4/2008 | Agnetta et al. |
| 2008/0107440 A1 | 5/2008 | Tsuzuki |
| 2008/0181622 A1 | 7/2008 | Adkins et al. |
| 2008/0183630 A1 | 7/2008 | Stephenson |
| 2008/0186187 A1 | 8/2008 | Adkins et al. |
| 2008/0186367 A1 | 8/2008 | Adkins et al. |
| 2008/0249712 A1 * | 10/2008 | Wang ................ 701/210 |
| 2008/0319845 A1 | 12/2008 | Adkins et al. |
| 2009/0006247 A1 | 1/2009 | Hansen et al. |
| 2009/0066985 A1 | 3/2009 | Ferlitsch |
| 2009/0070243 A1 | 3/2009 | Buck et al. |
| 2009/0070276 A1 | 3/2009 | Kodimer et al. |
| 2009/0147299 A1 | 6/2009 | Tetu |
| 2009/0192910 A9 | 7/2009 | Rankin et al. |
| 2009/0248578 A1 | 10/2009 | Pollock et al. |
| 2010/0039669 A1 | 2/2010 | Chang et al. |
| 2010/0088178 A1 | 4/2010 | Gnanasambandam et al. |
| 2010/0088201 A1 | 4/2010 | Nagarajan et al. |
| 2010/0097626 A1 | 4/2010 | Moore et al. |
| 2010/0264214 A1 | 10/2010 | Gnanasambandam et al. |
| 2010/0268591 A1 | 10/2010 | Gnanasambandam et al. |
| 2011/0011929 A1 | 1/2011 | Padua et al. |
| 2011/0013226 A1 * | 1/2011 | Grosz et al. ................ 358/1.15 |

OTHER PUBLICATIONS

U.S. Appl. No. 12/424,820, filed Oct. 21, 2010, Gnanasambandam et al.
U.S. Appl. No. 12/424,858, filed Oct. 21, 2010, Gnanasambandam et al.
GB Search Report, May 24, 2011.
"Pay per Click", Wikipedia, the Free Encyclopedia, Oct. 3, 2008, Web, Jan. 11, 2011, http://en.wikipedia.org/wiki/Pay_per_click.
"Pay per Click", Wikipedia, the Free Encyclopedia, Jan. 31, 2009, web, Jan. 11, 2011, http://en.wikipedia.org/wiki/Pay_per_click.
GB Office Action, GB1101124.4, Jun. 8, 2011.
"Pay per Click", Wikipedia, the Free Encyclopedia, Apr. 7, 2009, web, Jan. 11, 2011, http://en.wikipedia.org/wiki/Pay_per_click.
Hamm, Steven, "Rivals Say HP is Using Hardball Tactics", Business Week, New York: Feb. 19, 2007, Issue 4022, p. 48.
JD Biersdorfer, "Firewalls Hamper File Sharing Via Instant Messenger", New York Times, Oakland Tribune, Oakland, Calif., May 24, 2004, p. 1.
Wagstaff, Jeremy, "Personal Computing: Experts Give Answers to Readers' Questions on Guarding Privacy", Wall Street Journal. (Europe). Brussels: Jul. 17, 2003. p. A5.
JD Biersdorfer, "Sharing files via an instant messaging program", The New York Times, May 24, 2004 obtained from http://www.gainesville.com/article/20040524/BUSINESS/205240303, pp. 4-6.
Kelley, et al, Implementation of a Network Print Management System: Lessons Learned, Annals of Cases on Info. Tech., vol. 6, No. 1, 2004, pp. 293-311.

* cited by examiner

METHODS AND SYSTEM FOR MANAGING CREDIT CARD USAGE IN PRE-PAID PRINTING SYSTEM ACCOUNTS

BACKGROUND

The present disclosure is generally related to operation and management of document processing devices such as printers, scanners, copiers, combination scanner-printer-copier machines, and the like in accordance with customer accounts.

The disclosures of the following U.S. Patents and Patent Applications are hereby incorporated by reference in their entireties: U.S. patent application Ser. No. 12/364,224, entitled "METHOD AND SYSTEM FOR TRANSMITTING PROOF OF PAYMENT FOR "PAY-AS-YOU-GO" MULTI-FUNCTION DEVICES", and filed Feb. 2, 2009; U.S. patent application Ser. No. 12/424,820, entitled "METHOD AND SYSTEM FOR PROVIDING CONTRACT-FREE 'PAY-AS-YOU-GO' OPTIONS FOR UTILIZATION OF MULTI-FUNCTION DEVICES", and filed Apr. 16, 2009; U.S. patent application Ser. No. 12/424,858, entitled "SYSTEM AND METHOD FOR SELECTIVELY CONTROLLING THE USE OF FUNCTIONALITY IN ONE OR MORE MULTI-FUNCTION DEVICES AND SUBSIDIZING THEIR USE THROUGH ADVERTISEMENTS", and filed Apr. 16, 2009; U.S. Pat. No. 6,940,613, entitled "SYSTEM FOR MANAGING REPLACEABLE MODULES IN A DIGITAL PRINTING APPARATUS", and issued Sep. 6, 2005; U.S. Pat. No. 6,076,076, entitled "PREPAID PRINT CARD SYSTEM AND METHOD", and issued Jun. 13, 2000; U.S. Pat. No. 5,563,999, entitled "FORMS AUTOMATION SYSTEM", and issued Oct. 8, 1996; U.S. Patent Application Publication No. 2007/0094148, entitled "METHOD OF LICENSING FUNCTIONALITY AFTER INITIAL TRANSACTION", and published Apr. 26, 2007; U.S. Patent Application Publication No. 2004/0125397, entitled "LICENSING METHOD FOR USE WITH $A_N$ IMAGING DEVICE", and published Jul. 1, 2004; and U.S. Patent Application Publication No. 2004/0153415, entitled "METHOD OF LICENSING FUNCTIONALITY AFTER INITIAL TRANSACTION", and published Aug. 5, 2004.

Document processing devices are often employed in networked systems in business and academic sites providing users the option of sending a given print job to one of several devices for processing. Organizations employing multiple document processing devices desire options for financing and tracking printer utilization, and may prefer to pay for print services and related devices and materials based on usage rather than paying up front for equipment and consumable accessories. Moreover, manufacturers and resellers of document processing devices desire the ability to provide such account options to end-users. Thus, there is a need for improved methods and systems for managing document processing device usage.

BRIEF DESCRIPTION

Document processing device account management systems and methods, and customer computer agents are disclosed for managing document processing device usage in which a customer initially purchases a document processing device, such as a printer, scanner, copier, or a multi-function device providing one or more of such document processing functions such as a combination scanner-printer-copier machine, where the device does not print until authorized by the manufacturer by application of print units from a customer account. The customer accesses a management system to setup automated purchase of account credits, and automated application of print units to specific managed devices by conversion of account credits. The device consumes or expends the applied print units in performing document processing operations such as printing, scanning, copying, etc., for preselected member computers and non-members may utilize a given device on a job-by-job basis via an agent on the non-member computer.

In accordance with certain aspects of the disclosure, a method and an account manager system are provided for managing prepaid usage of document processing devices that allow customer initiated operation based on available print units applied to the device. The method involves storing account information in a data store for a plurality of customer accounts. The account information includes an available credits value, and current pricing information used for converting account credits to print units for specific document processing devices registered to the account. In certain embodiments, the account information further includes registered device information with device subaccount information for one or more device subaccounts individually associated with particular document processing devices. The account information also includes automated buy information including an automatic buy amount of account credits authorized by a customer to be purchased automatically, and automated apply information including an automatic apply amount of print units to be automatically applied to a specified document processing device registered to the account. The method further includes automatically adding a number of credits corresponding to the automatic buy amount to a given account at a current rate and adding a corresponding number of credits to the available credits value for the given account at a first predetermined time. The method also includes automatically applying a number of print units corresponding to the automatic apply amount to a device at a second predetermined time.

In certain embodiments, the automated buy information includes a buy threshold value for a given account, that indicates the amount of credits at which further credits are to be automatically added, and once the available credits value for that account reaches the threshold level, the credits are automatically added at a current rate. The automated buy information may also include a customer-defined buy limit value indicating the maximum number of account credits to be automatically purchased in a first predefined length of time, such as in each calendar month.

In some embodiments, the customer can define different business units or departments and the account information includes a plurality of department available credits values. In this case, the automated buy information for the at least one account includes a plurality of department automatic buy amounts, department buy threshold values, and department buy limit values corresponding to the customer departments.

The account information in certain embodiments also includes a deficit limit amount that indicates a predetermined negative limit to the available credits value, and the automated credit addition and print unit application are done in a manner that avoids exceeding the deficit limit amount for a given account. Deficit limits may also be defined for customer departments, with the automatic print units applications being done so as to avoid exceeding the department deficit limit amounts.

In certain embodiments, the device subaccount information includes a device remaining print units value and the automated apply information includes an apply threshold value indicating an amount of print units at which further print units are to be automatically applied to a specified document processing device registered to the account. When the remaining print units value for a given device is at or below the corresponding apply threshold value, a number of print units are automatically applied based on the automatic apply amount. In certain embodiments, moreover, an apply limit value is stored which indicates a maximum number of print units to be automatically applied to the device in a predefined time period.

In other aspects of the disclosure, a method is provided for facilitating prepaid usage of at least one document processing device configured to allow customer initiated operation based on available print units applied to the device. The method includes submitting a document processing job to a document processing device operatively coupled with the network, receiving a job cost value in terms of print units from the document processing device, sending an authorization request including the job cost to an account manager system via the network and a portal, and forwarding an authorization message from the account manager system to the document processing device to apply a number of print units to the device corresponding to the job cost value and to authorize the device to perform the document processing job.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
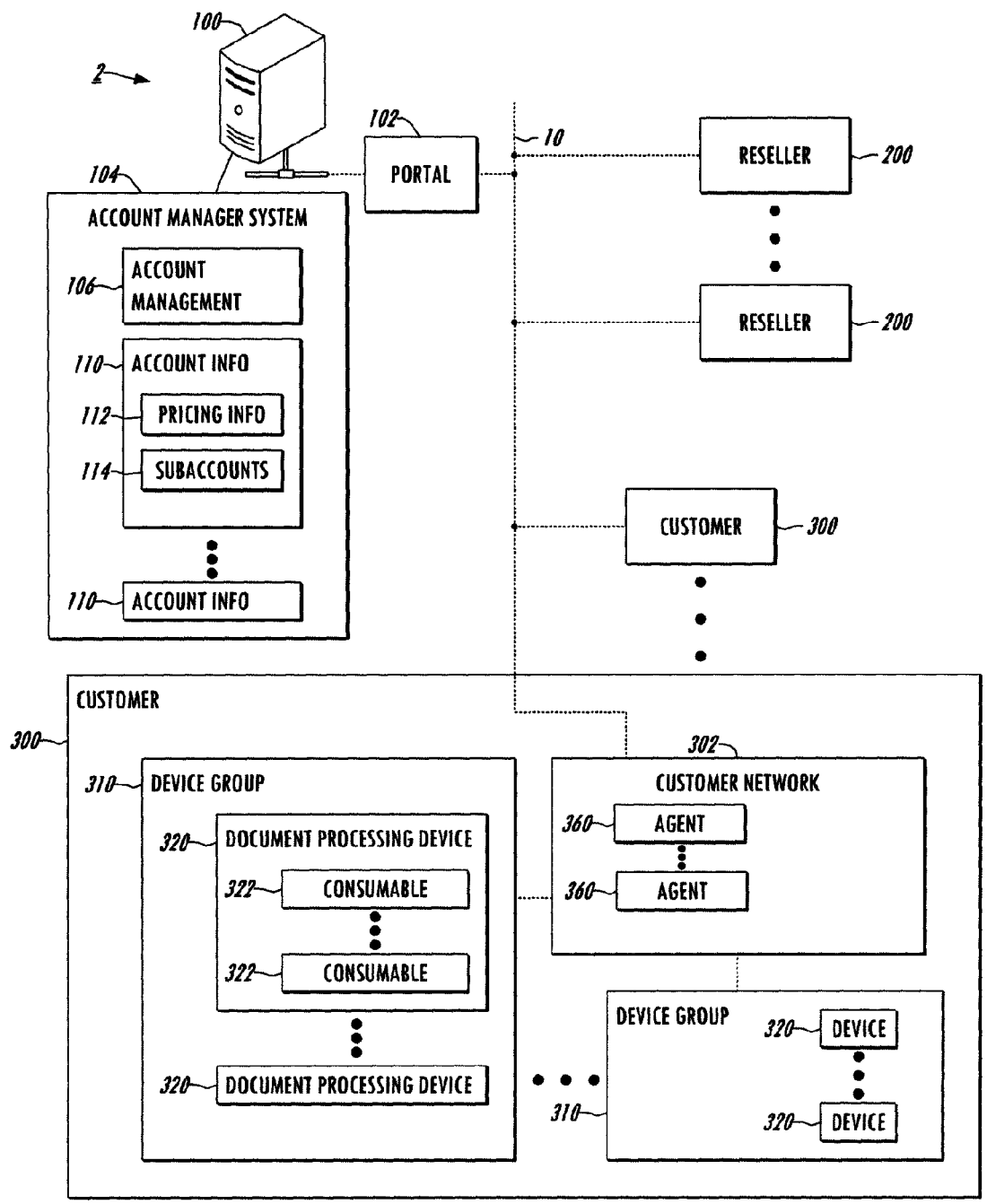
FIG. 1 is a system diagram illustrating an exemplary commercial environment with an account manager and various resellers and customer sites networked in which one or more aspects of the present disclosure may be implemented.

Referring now to the drawings, FIG. 1 shows a networked commercial environment 2 with one or more networks 10 interconnecting a server 100 with one or more resellers 200 and customers 300, where access to an account manager system 104 implemented in the server 100 is accomplished via a portal 102. The server 100 can include a single computer processor or multiple processing elements, and the server 100 may be implemented as a single integrated processor-based structure including memory or may be implemented in distributed fashion including multiple structures, some of which are processor-equipped. The account manager system 104 can be any suitable combination of processor-based hardware, logic, processor-executed software, firmware, or combinations thereof, and may be implemented in a unitary platform (e.g., server 100) or in distributed fashion across multiple processor-equipped devices. In the embodiments, the reseller(s) 200 and customer(s) 300 include reseller and customer networks, respectively, with computers at the reseller(s) 300 and customer(s) 300 being equipped with agent software programs (e.g., customer agents 360 in FIG. 1) operative to allow authorized, secure, encrypted communication between authorized reseller/customer personnel and the account manager system 104 through access via the portal 102. Moreover, the customer agents 360 provide for operation and management tasks between customer document processing devices 320 registered to a customer account and the account management system 104 via the portal 102, and also allow customer to use the agent 360 to communicate with one or more processing devices 320 coupled to a customer network 302. The customer network 302 may include any form of electronic communication network(s) by which the devices 320 can communicate directly or indirectly with the customer computers 330 and/or with the account manager system 104, including without limitation dedicated networks, internet connections, and may include connection of one or more devices 320 with the account manager system 104 via telephony networks (wired and/or wireless or combinations thereof). Thus, the network connection of the devices 320 includes situations in which a primary network connection is inoperative ("network down" condition) with recovery or alternative communications means (e.g., telephone line connection to the devices 320) being provided as an alternative for communication between the devices 320 and the account manager system 104 for validation or other steps.

Figure 2:
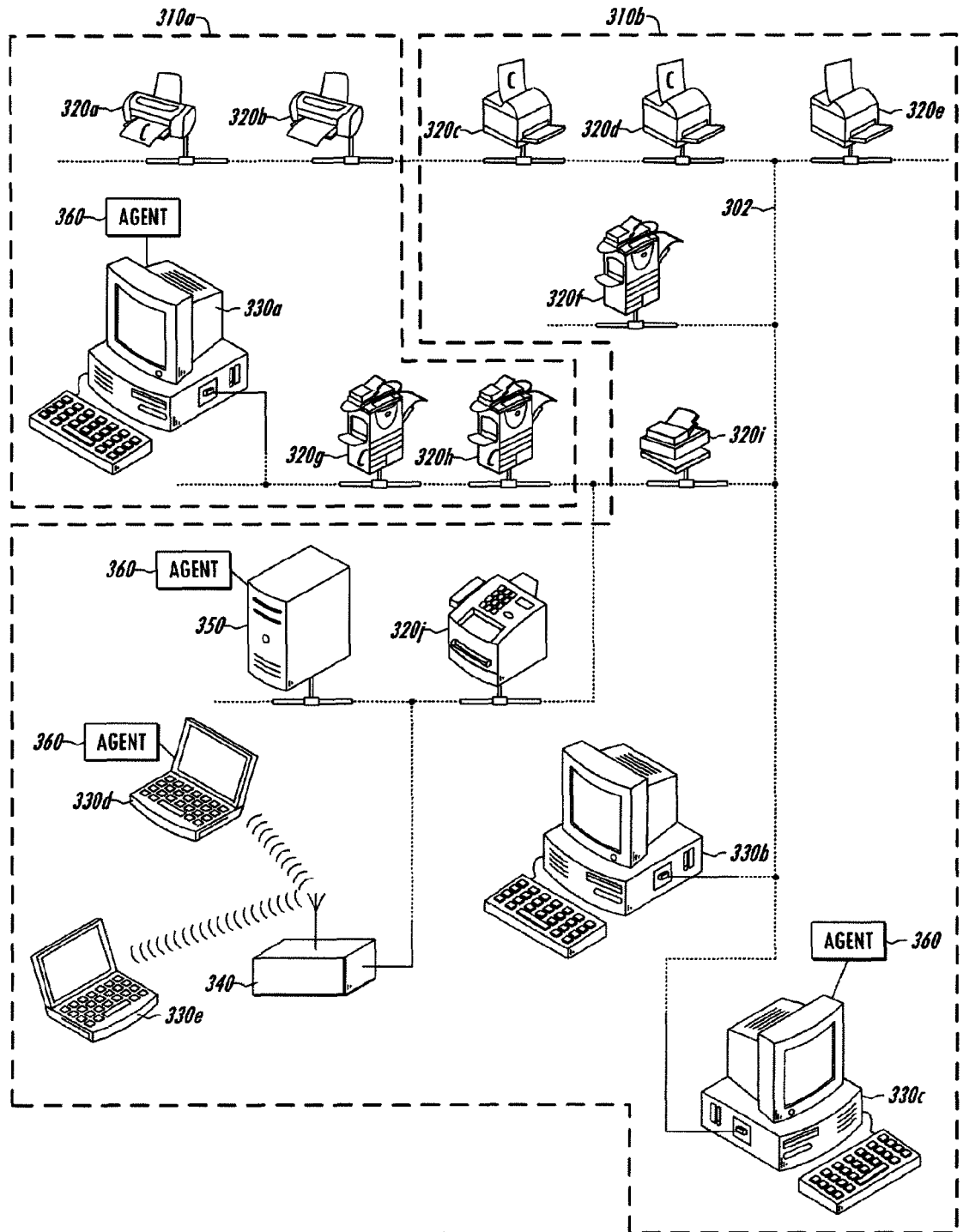
FIG. 2 is a system diagram illustrating further details of an exemplary customer networked computing environment with a plurality of user computers with printer device management agents, and with a plurality of printer, scanner, copier, and multi-function type document processing devices that may be managed according to various techniques of the present disclosure.

Referring also to FIG. 2, an exemplary distributed customer computing environment is illustrated, including two exemplary logical device groups 310a and 310b, each including one or more computing devices 330, some of which are equipped with agent components 360. In the illustrated environment, the computers 330 are selectively authorized to print or initiate other document processing operations via the devices 320 or predefined subsets of the devices 320, for example, by appropriate password entry & verification via the customer's network 302 and associated network elements and/or by access/usage control features implemented in the devices 320 themselves. The individual groups 310 also include one or more document processing devices 320. The illustrated customer computers 330 and device 320 are operatively coupled via a customer network 302 which may be any suitable form of communications network or interoperative networks. In addition, one or more print servers 50 are coupled with the network 302, where certain portions of the network 302 may be interconnected by cabling or one or more portions may be wireless, and where one or more exemplary computers 330d and 330e are illustrated in FIG. 2 with operative communicative coupling to the network 302 being implemented using a wireless network transceiver interface component 340. Any number of user computers may be operatively coupled to the network 302, including without limitation desktop computers 330a and 330b, laptop computers 330d and 330e, and any number of document processing devices 320 may be coupled with the network 302. Different forms of document processing devices 320 are networked together in this example to provide the user computers 330 with a broad range of document processing options available for a given print job or other task. One or more of the devices 320, moreover, are registered to one or more customer accounts and are operable via the network 302 or by users actuating on-board controls (e.g., buttons, keypads, etc.) for copying and scanning operations and other tasks. The document processing devices 320 may include one or more managed consumables 322 (FIG. 1 and FIG. 4 below) such as non-print media items or materials consumed by the device during document processing operations, including without limitation toner, ink, a replaceable fuser module/component, replaceable imaging units, waste toner bins, transfer belt, or the like.

The exemplary document processing devices 320 shown in FIG. 2 include relatively low throughput externally fed color as well as black and white desktop printers 320a and 320b, respectively, intermediate speed drawer fed color and black and white printers 320c-320e, high volume color as well as black and white printer/scanner/copier (i.e., multi-function) devices 320f-320h, a desktop combination printer/scanner/copier 320i and a combination printer and facsimile machine 320j. Document processing devices 320 may include any device operable to perform one or more document processing functions, including without limitation printers, scanners, copiers, combination scanner-printer-copier machines, and the like. In FIGS. 1 and 2, the customer network 302 and the external network 10 can be arranged in any suitable configuration for example star, ring, bus, tree, mesh, etc. or combinations thereof, and may be a wired network, a wireless network, or combinations thereof, wherein the illustrated customer network 302 of FIG. 2 provides one or more wireless nodes 340 for connectivity for portable laptop computers 330d and 330e through various WiFi or other wireless means.

The devices 320, moreover, are configured to allow normal customer/user initiated operation based on available print units applied to the device 320 in accordance with a customer account administered via the account manager system 104, and may optionally be authorized by the account particulars to perform at some low level of functionality even when the applied print units are depleted as discussed further below. By this device functionality, all or at least certain aspects of the actual or expected cost of document processing operation of a given device can be attributed to the customer based on usage, including the initial device cost, cost of consumables 322, costs for servicing (e.g., repairing, troubleshooting, etc.), costs for access to customer support, and other associated costs, rather than being paid up front by the customer.

Figure 3:
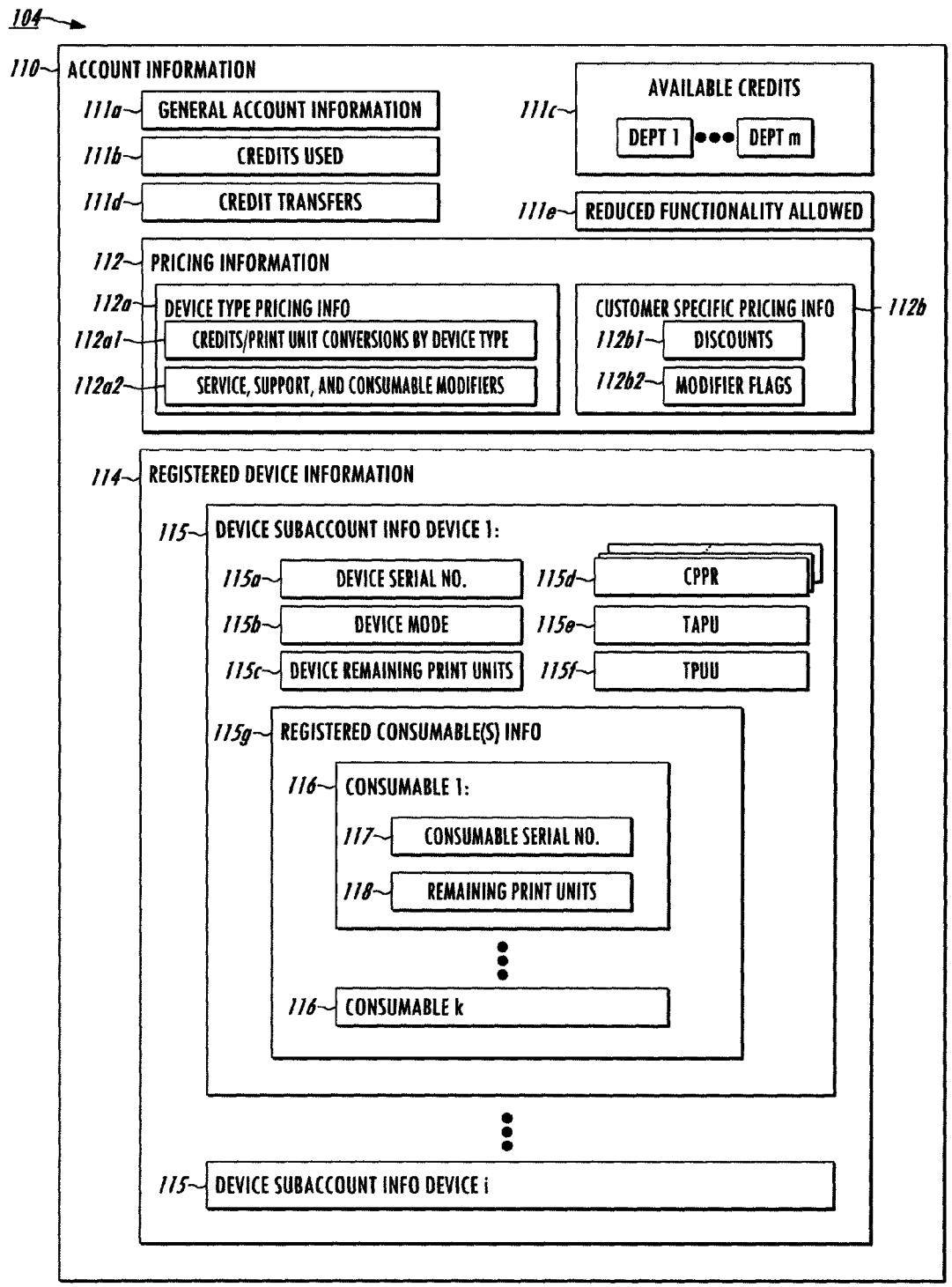
FIG. 3 is a schematic diagram illustrating exemplary account information stored in the account manager system of FIG. 1.

Referring now to FIGS. 1 and 3, usage of the devices 320 is managed via these prepaid accounts by the system 104 using various account information 110 stored in a data store operatively coupled with the server 100, where the data store can be external or internal to the server 100 or combinations of internal and external storage. The account information 110 is stored for a plurality of accounts, for example, a first account for management of prepaid devices 320 of the first device group 310a in FIG. 2 and a second account for devices 320 of the second group 310b, and account information is also stored for multiple different customers, including those customers or 'vendors' that register so-called 'public' devices 320 as discussed further below in connection with FIG. 11.

As best shown in FIG. 3, the account information 110 for individual accounts includes general account information 111a (e.g., account owner name, address, billing information, authorized users, etc.), a credits used value 111b, for instance, indicating the number of credits that have been previously applied to devices 320 to date from account inception, or in a given predefined period (e.g., year-to-date, etc.), and an available credits value 111c indicating an amount of account credit units currently available to the account for which the corresponding customer has previously paid and which can be applied to one or more devices 320 by customer-initiated request. The available credits information 111c in certain embodiments includes two or more values indicating credits available for different departments or organizational entities within a given customer enterprise. The account information 110 in this embodiment also includes credit transfer information 111d and reduced functionality permission information 111e (described further below in connection with FIG. 3).

The account information 110 for a given account also includes current pricing information 112 including at least one conversion factor for converting account credits available to the account to print units for specific document processing devices 320 registered to the account. The current pricing information 112 for individual accounts in this embodiment includes device type pricing information 112a including at least one price factor 112a1 for each specific document processing device type for converting account credits to print units, and at least one print unit price modifier 112a2 for each of a plurality of different specific document processing device types for increasing the print unit price if a given customer account provides for including one or more additional cost factors for consumables, service, and support in the print unit price. The pricing information 112 also provides customer specific pricing information 112b including discount information 112b1 and modifier flags 112b2 indicating applicability of one or more of the print unit price modifiers 112a2 for the given customer account.

In some embodiments, different discount information 112b1 can be provisioned in the account information 110 for specified document processing devices 320 obtained by a given customer from different resellers 200 and/or for specified document processing devices 320 obtained in different locations or regions, thereby providing reseller flexibility in offering discount incentives to select customers on a global or locality basis. Program provisions can be associated with specific account numbers prior to a reseller offering the accounts for sale to end-customers 300, for example, where the account particulars include account pricing (conversion rates for converting credits into print units), print unit valuation equivalent to typical print images based on coverage, color content, etc., inclusions of service, supplies and media, various incentives, etc. The pre-established account particulars can be associated with a device 320 upon account initiation prior to delivery to the customer 300. In addition, promotional incentives like time frame duration and/or number of printed images can be managed in concert with product usage information associated with and tracked by a customer account, for instance, by tracking use debits and credit balance payments and various particulars of image content.

Account credits are a global currency, which may, but need not, be tied to one or more official government monetary currency value (e.g., N credits per U.S. dollar, etc.) thereby allowing customers to purchase credits for their account(s) using any form of legal payment (e.g., payment obtained and verified electronically via financial institutions, credit organizations, etc.) or direct monetary payments, whether in Dollars, Euros, Yen, etc., with the account manager system 104 being operative to obtain current exchange rate information and make any necessary conversions from a given legal currency payment amount to an account credit amount. Print units, on the other hand, are valued for a given device type and possibly other factors, in terms of units per account credit on a transactional basis at the time of a user request to apply account credits to a particular document processing device, with the valuation being in terms of document processing operations, for instance, one print unit per monochrome page printed by a device 320, 5 print units per printed color page, where a processed 'page' as used herein is a single side of a printed media sheet (or a single page of a multi-page document or print job being scanned or operated on by a device 320), such that a device 320 consumes one print unit for printing monochrome images, text, etc., on a single side of an output sheet, consumes 5 print units for printing color images, text, etc. on a single side of a printable medium, and consumes 2 print units to print monochrome images, text, etc. on both sides of a printable media sheet in one example. The application of credits to devices 320, moreover, may be done with respect to integer and/or fractional credits and print units. For example, the customer may specify a given amount of account credits (in whole credits or fractions thereof) to be 'applied' to a device 320, and the account manager system may present the customer with the number of converted print units for that device 320, and the device may be adapted to accept fractional print unit amounts or the account management system may perform rounding to provide only integer print unit amounts, with any fractional values being retained as fractional credits in the customer account.

As illustrated in FIG. 3, the account information 110 also includes registered device information 114 with device sub-account information 115 for a plurality of device subaccounts individually associated with a particular document processing device 320 registered by the customer to the account. The device subaccount information 115 for individual device sub-accounts includes a device serial number 115$a$ to identify devices 320 registered to the account, a device mode indicator 115$b$ (e.g., including a value indicating toner out, a value indicating whether or not the corresponding device 320 is managed by the system 104, etc.), a remaining print unit value 115$c$ indicating the amount of print units previously applied by the customer to the particular document processing device 320 and currently available to enable the particular document processing device 320 to perform document processing operations, at least one current page price ratio (CPPR) value 115$d$ indicating the number of applied available print units the particular document processing device 320 will consume to print a color page, a total applied print units value (TAPU) 115$e$, and a total print unit used (TPUU) value 115$f$ indicating the total number of print units used by the corresponding document processing device 320. In addition, the device sub-account information 115 includes registered consumable(s) information 115$g$ including consumable information 116 for one or more consumable individual components 322 operatively associated with the particular document processing device 320 with a consumable serial number or other identifier 117, and a remaining print units value 118 in one example.

Figure 4:
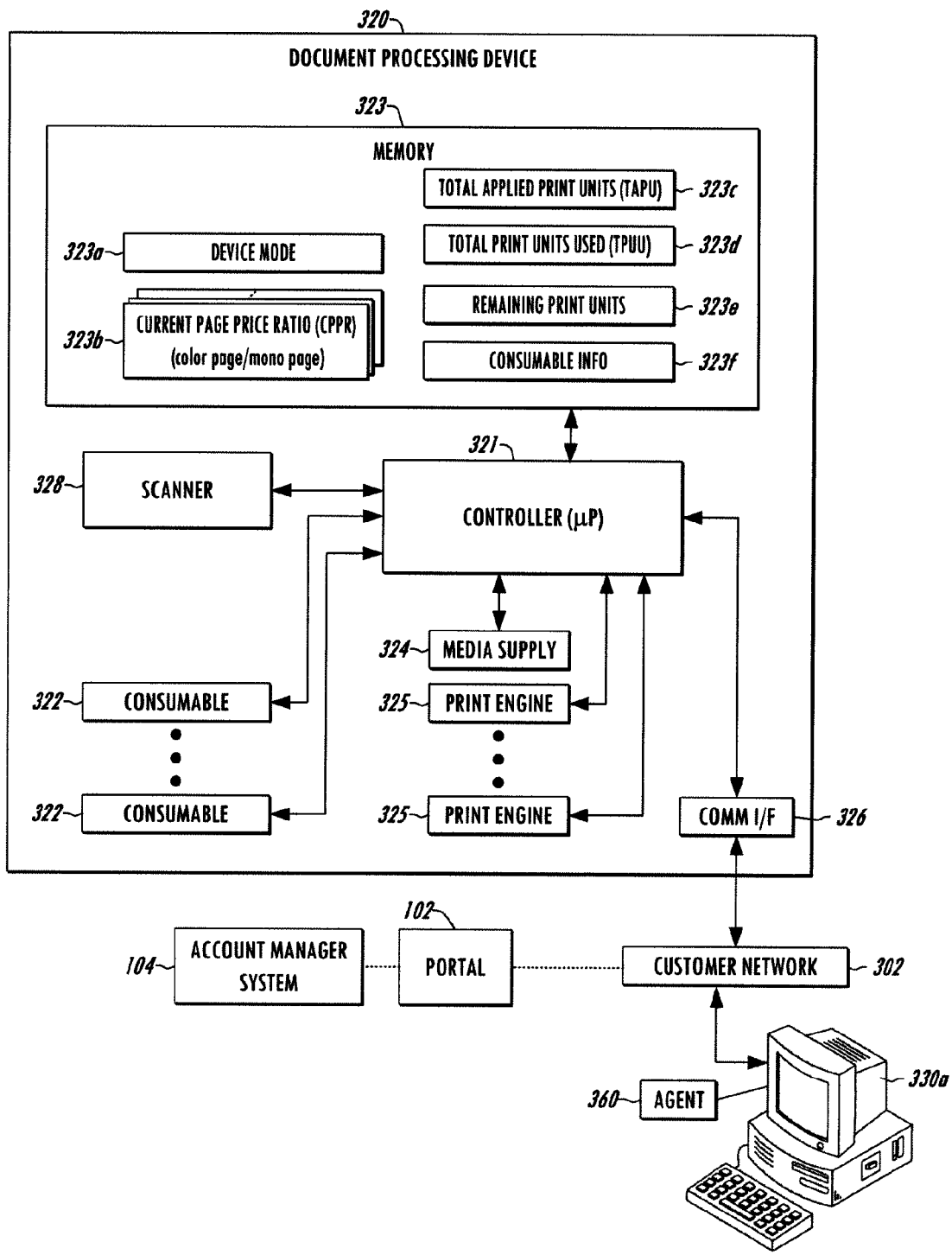
FIG. 4 is a schematic diagram illustrating further details of an exemplary document processing device registered to an account managed by the account manager system of FIG. 1.

In operation, a customer can request an estimate of remaining pages for a specific device 320 registered to the customer's account via an agent 360 and the portal 102, and the account manager system 104 in one embodiment will provide the remaining print units count value 118 in response. In certain implementations, the customer can use the agent to directly obtain this count value from the device itself via the agent 360 and the customer network 302 (e.g., the device 320 will report the current remaining print units value 323$e$ from its internal data in memory 323 as shown in FIG. 4). In certain embodiments, the account manager system 104 may provide the customer with an estimate of the number of remaining mono and color pages printable, for example, by analyzing historical print data (color vs. mono printing) for the particular device 320 and use this in conjunction with the CPPR value 115$d$ to estimate the number of mono and color pages for the customer. The account information 110 can thus accommodate multiple accounts for multiple customers 300, each associated with multiple document processing devices 320 of an unlimited number of different device types, where the devices can have one or more identified consumables 322 for management by the account manager system.

Figure 7:
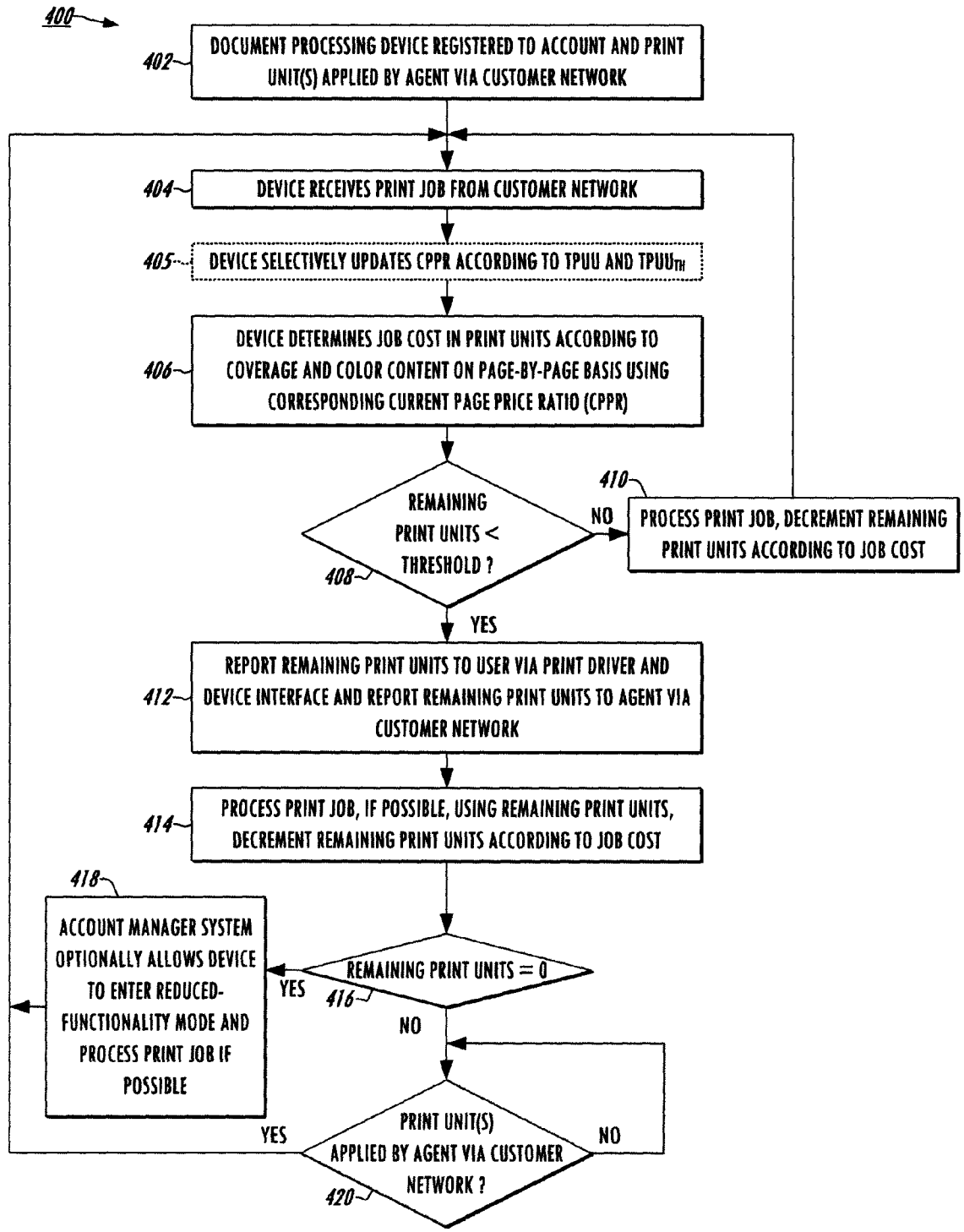
FIG. 7 is a flow diagram illustrating exemplary operation of a customer document processing device.

Referring also to FIGS. 4 and 7, an exemplary document processing device 320 is shown in FIG. 4 with a processor-equipped controller 321 and a memory 323, where the device 320 is programmed or provided with suitable processor-executed software, firmware, logic, etc. to controllably provide document processing functions such as printing, faxing, scanning, or combinations thereof and to implement the print unit consumption features of a device registered to an account managed by the account manager system 104. In the illustrated example, a communications interface 326 provides for interfacing the device 320 with the customer network for communicative exchange of data, information, print jobs, etc. with other networked devices, computers, etc., including user computers 330 and agents 360 thereof, and with the account manager system 104 via the portal 102. In addition, the device 320 includes one or more document processing components or systems, such as one or more print engines 325, a scanner 328, media supply 324, and consumable(s) 322, and other such devices (e.g., scanners, sheet feeders, etc., not shown). The memory 323 in this example stores program code and processor-executable instructions for implementing the device functionality, as well as local data to support this operation, including the current device mode information 323$a$ (e.g., corresponding to the mode information 115$b$ in the account information 110 in FIG. 3), one or more current page price ratio value(s) (CPPR) 323$b$ (corresponding to the CPPR value(s) 115$d$), a TAPU value 323$d$ (corresponding to TAPU value 115$e$), a TPUU value 323$d$ (corresponding to TPUU 115$f$), and consumable information 323$f$ obtained from processing elements of the consumable(s) 322 via the controller 321 (corresponding to consumable information 116 in FIG. 3), where the customer agent 360 operates when possible to obtain information from the device 320 (while device 320 is connected to the network 302), and updates the account information of the account manager system 104 accordingly.

FIG. 7 illustrates exemplary operation of the document processing device 320 in a process 400, in which the device 320 is initialized or registered at 402 to one or more customer accounts by the customer 300 or by a reseller 200, and one or more print units are applied to the device 320 by the customer via a customer agent 360. The example of FIG. 7 is illustrated and described in the context of a printing operation, but similar operation is provided for any other form or type of customer/user-requested document processing operation by a device 320. At 404, the device 320 receives a print job from the customer network 302 (alternatively print job may be part of a copy operation initiated at the device 320 itself, or a print job could be provided by a computer 330 connected to the device 320 even if the device 320 is currently not connected to the network 302). At 405, in one embodiment, the device 320 optionally selects an appropriate current page price ratio (CPPR) from a stack 119 (FIG. 6 below) of page price ratio (PPR) values 119a according to the current value of the total print units used (TPUU) 323d and according to a threshold value $TPUU_{TH}$ 119b in the stack 119. At 406, the device 320 in one embodiment determines the cost for performing the job in terms of print units according to the coverage and color content on a page-by-page basis using CPPR value(s) 323b (FIG. 4), and a determination is made at 408 as to whether the remaining print units (value 323e in FIG. 4) is less than a threshold. In other implementations, the device 320 may determine the job cost based on color content for the entire job (i.e., page cost determined to be 'color' for each page if at least one page of the job uses color).

Figure 5:
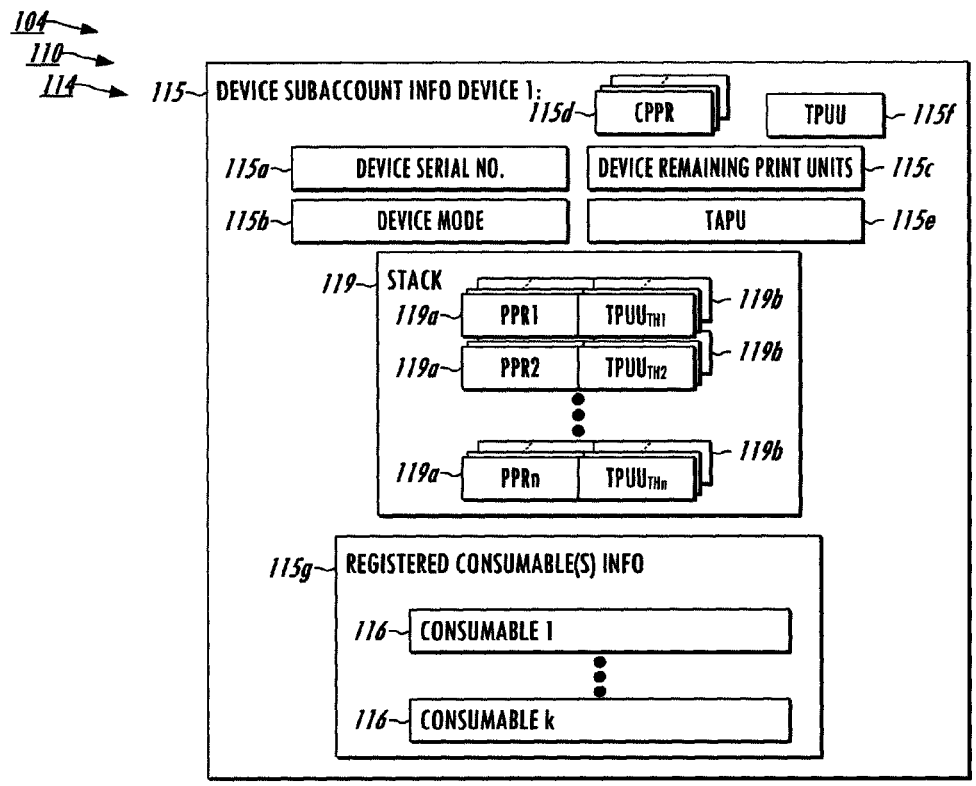
FIG. 5 is a schematic diagram illustrating another embodiment of the account information stored in the account manager system of FIG. 1.
Figure 6:
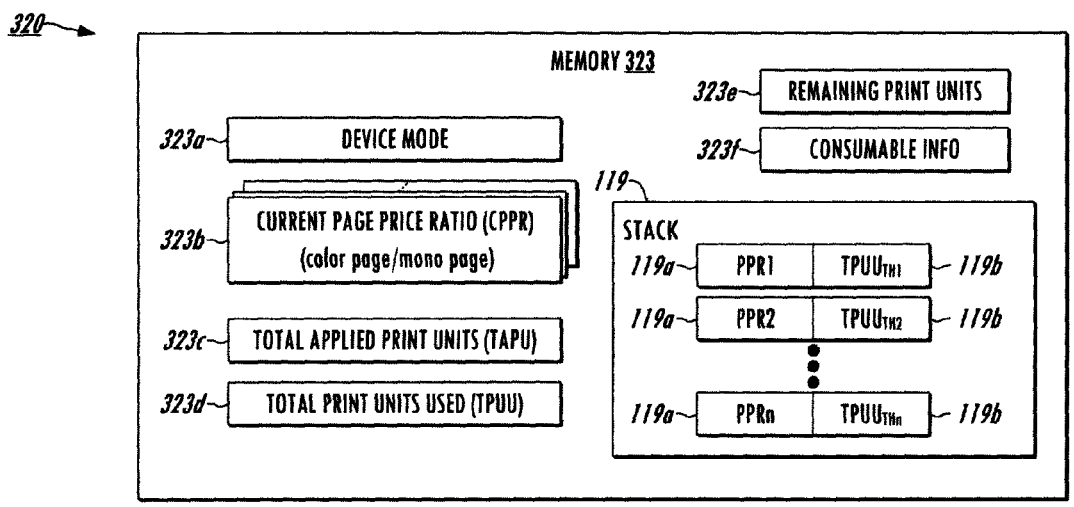
FIG. 6 is a schematic diagram illustrating another embodiment of the document processing device.

As shown in FIG. 3, the device subaccount information 115 for individual device subaccounts in certain embodiments may include a plurality of different current page price ratios 115d indicating the ratio of the number of applied available print units particular document processing device 320 will consume to print a color page vs. that of a monochrome page, which correspond to different page coverage levels for color pages of documents to be processed. Moreover, the device 320 likewise maintains a corresponding plurality of CPPR values 323b as shown in FIG. 4. In this manner, the account manager system 104 authorizes a specific document processing device 320 to determine page coverage levels for a given color page of a given print job and to consume a corresponding number of available print units to print the given color page according to the corresponding current page price ratio 115d chosen based on the coverage. The CPPR selection for coverage differences can be done in some embodiments on a page-by-page basis. In other embodiments, the device 320 may be configured to determine an average coverage level for all or a subset of the pages of a given jobs and select the corresponding CPPR 115d for the entire job. Moreover, the account manager system 104 may provide the devices 320 with multiple pairs of page price ratio (PPR) values 119a and corresponding threshold values ($TPUU_{TH}$) 119b with each pair corresponding to a different page coverage value, as shown in FIGS. 5 and 6. In certain embodiments, CPPR may be applied based on printing over a time period, such as days or weeks, or be based on attainment of cumulative totals for a number of pages or jobs.

Returning to FIG. 7, if the required number of print units is available (NO at 408), the print job is processed by the device 320 at 410, and the process 400 returns to await the next document processing task/job at 404. If however, the remaining number of print units is below the threshold (YES at 412), the device 320 reports the remaining print units (value 323e in FIG. 4) to the user (e.g., via an on-board display and/or via a print driver employed in submission of the print job), and reports the remaining print unit value 323e to an agent 360 via the customer network 302 if currently connected thereto. At 414, the print job is processed by the device 320 (if possible using remaining print units), and the value 323e is decremented according to the cost of the processed job. Otherwise, a determination is then made at 416 as to whether any print units are left in the device 320 (e.g., whether the value 232e has reached zero). If the device is depleted (YES at 416), the device 320 notifies the agent 360, which then notifies the account manager system 104 of the empty status of the device 320, and the account manager system 104 may optionally allow the device 320 to perform at a predetermined reduced level of functionality at 418 (e.g., only print monochrome, only print small jobs, only perform faxing and scanning, etc.) according to the reduced functionality information 111e (FIG. 3). At any point, moreover, authorized customer personnel may apply additional print units to the device at 420 via an agent component 360 and the account manager system 104, after which the unit returns to normal operation. In this manner, the operations of the devices 320 are controlled by the selective application of print units, without which the device 320 will not print (other than the optional account provisions for reduced functionality operation with account-specified restrictions).

Figure 8:
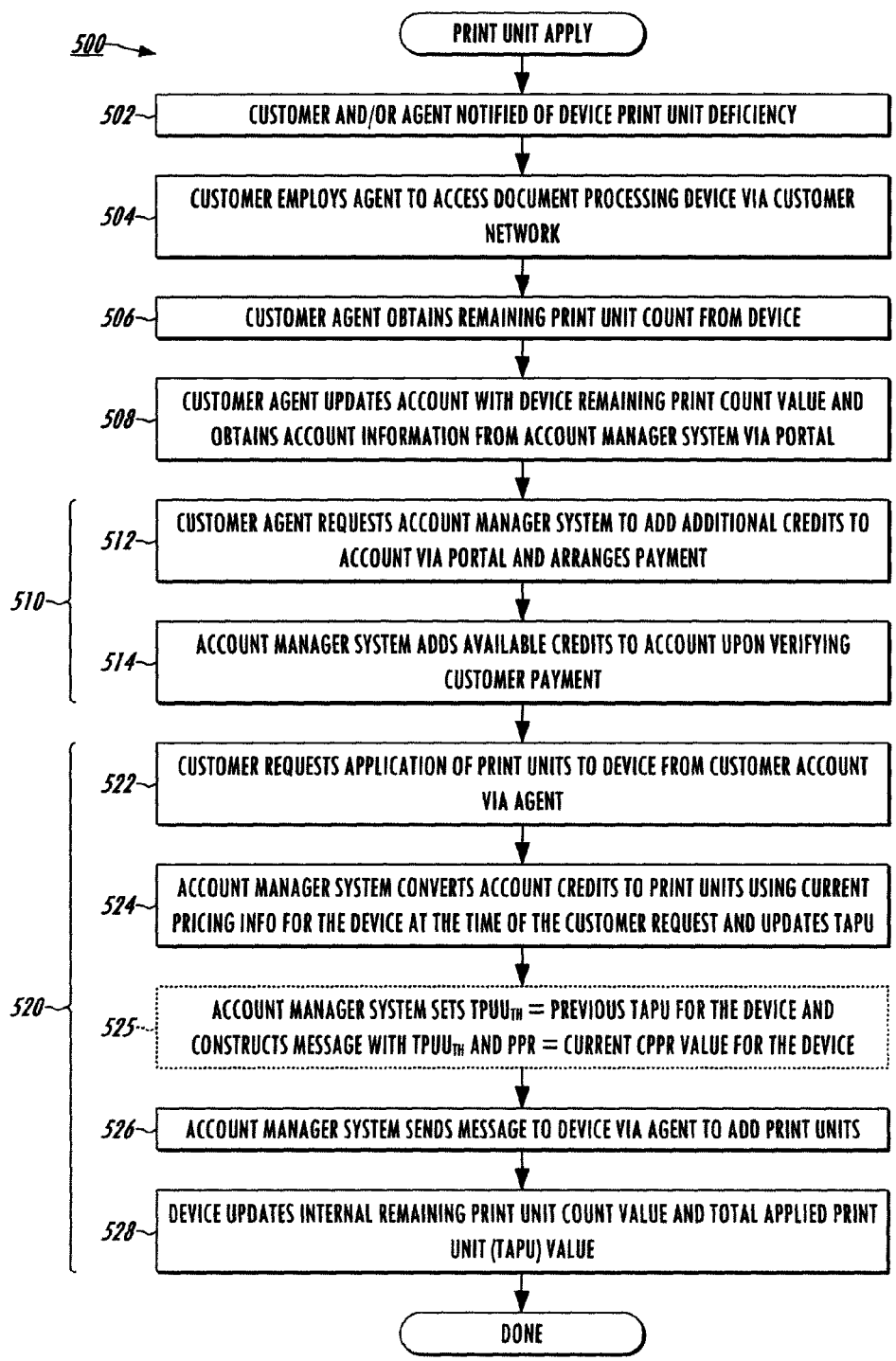
FIG. 8 is a flow diagram illustrating an exemplary process for buying and applying credits to one or more document processing devices.

FIG. 8 illustrates an exemplary process 500 by which the account management component 106 of the manager system 104 (FIG. 1) adds credits to an account at 510 and applies print units to a device 320 at 520 upon corresponding request(s) from a customer of a specified account via an authorized agent 360 and the portal 102. In the illustrated process 500, the customer and/or agent 360 are notified at 502 that a particular device 320 has no remaining print units (or that the print unit level is below a threshold value, as discussed in FIG. 7 above). At 504, the customer employs the agent 360 to access the device 320 through the customer network 302, and obtains the remaining print unit count (e.g., value 323e in FIG. 4) from the device 320. At 508, the customer agent 360 accesses the account manager system 104 via the network 10 and the portal 102, updates the corresponding customer account with the remaining print count value (e.g., value 115c in FIG. 3 above), and obtains the corresponding account information 110 for informing the customer of the current account status, such as currently available credits that can be applied to the empty device, current pricing information, etc.

At 510, the account manager system 104, upon customer credit purchase or 'buy' request via the agent 360 and portal 102, selectively adds credits to the specified account at a current rate and add a number corresponding to a paid amount of new credits to the available credits value 111c for the specified account if and when the payment for such by the customer is verified. In this example, the agent 360 requests the addition at 512 via the portal 102, and arranges payment, such as via an electronic third party payment mechanism, not shown. At 514, when the account manager system 104 is able to verify the customer payment, it adds available credits to the corresponding customer account, and thus increments the value 111c in the account information 110.

At 520, the account management component 106, upon a request from the customer via the authorized agent 360 and the portal 102, applies print units to a specified document processing device 320 associated with the specified account by converting a number of credits currently available to the specified account into a number of print units according to the specified document processing device 320 and the current pricing information 112 for the specified account at the time of the request. In this example, the customer requests application of print units at 522 to the device using available account credits. At 524, the account manager system 104 converts account credits to print units using the current pricing information 112, and updates the total applied print units (TAPU) value 115e in the corresponding device subaccount information 115. In one embodiment, account manager system 104 updates a stack 119 (FIG. 5 below) at 525 with a new pair of page price ratio (PPR) and threshold values $TPUU_{TH}$ 119a and 119b, respectively, by setting the new $TPUU_{TH}$ to the pervious TAPU value (i.e., the total applied print units (TAPU) value before the current application of further print units). The account manager system 104 sends a message at 526 to the device to add the applied print units (via the agent 360). The device 320 then updates its internal remaining print unit count value 323e and its total applied print units (TAPU) values at 528. In this regard, it is noted that the valuation of the print unit cost is done at the time of application of print units to devices 320, and not when credits are initially bought by the account holder, whereby the system 104 is operative to track sales transactions at the appropriate time when the customer actually purchases the value of the prospective document processing services, which may include consumable, service, support, and other cost factors.

It is further noted that the interaction of the account management component 106 of the system 104, the agent components 360 on the customer computers 330, and the devices 320 can be implemented using multiple messages for requests, confirmations, authorizations, data exchanges, value updates, and other tasks, and the messages can be created and transmitted via any suitable network protocols, etc., and where the messaging is preferably controlled by appropriate authorization, password permission control, encryption, and other techniques to prevent uncontrolled print unit creation without authorization by the account manager system 104, and to guard against unauthorized access to the account information 110. In an alternative implementation, the concept of print unit deficiency notice may be supplemented or supplanted by an arrangement to use a low or out print unit threshold to trigger an automatic purchase of additional print units.

Referring also to FIGS. 5 and 6, the account manager system 104 and the devices 320 in certain embodiments implement an adaptive form of page price ratio adjustment to accommodate changes in the relative cost of printing color versus monochrome pages for a given device 320. For example, a ratio of three (3) may apply for a given document processing device 320 (e.g., according to the device type, the customer account parameters negotiated with the reseller 200, customer region, etc.) at an initial period of time, and this ratio may thereafter change to two (2). The change in the page price ratio may be a negotiated customer-specific arrangement, such as a discount for color printing in a given year or other time period after a certain threshold number of print units are used by that device (e.g., TPUU value 323d in the device memory 323, value 115f in the corresponding device subaccount information 115). In another example, the ratio may change to reflect changes in consumable costs, such as a decrease in color toner cost, with savings passed on to the customer. In order to accommodate such potential changes while minimizing large potential swings in the costs experienced by the customer, the account manager system 104 correlates the ratio with applied print units at the time these are applied to a given device 320, and the device 320 will use the ratio correlated with specific print units as these are expended in performing document processing operations. Thus, for a given device having a large number of print units remaining unused when a page price ratio change occurs, the new ratio will not be applied to the previously applied print units.

To implement this approach, the account manager system 104 and the devices 320 maintain corresponding information stacks 119, where the device subaccount information 115 for a given device 320 in the account manager system 104 includes a stack 119 as shown in FIG. 5, and the device memory 323 also stores a corresponding stack 119 as shown in FIG. 6. As described above and shown at 525 in FIG. 8, each time new print units are applied to a given device 320, the account manager system 104 constructs and sends a message to the device 320 (via the portal 102 and corresponding customer agent 360), including a new stack entry having a page price ratio (PPR) 119a that is set to the present value of the CPPR 115d at the time the print units are applied. The account manager system 104 also sets a threshold $TPUU_{TH}$ 119b in the stack to the previous total applied print units (TAPU) value 115e of the device subaccount information 115. The system 104 then increases the TAPU value 115e to reflect the application of new print units for that device 320 and sends one or more messages to the device 320 to provide the stack entry pair PPR 119a and $TPUU_{TH}$ 119b to the device 320 and to authorize the increase in the device's remaining pint units value 323e for the application operation. The device 320, in turn, updates its stack 119 with the new entry pair PPR 119a and $TPUU_{TH}$ 119b and increases its remaining print units value 323e in the memory 323.

During printing or other document processing in this embodiment, (as discussed above and shown at 405 in FIG. 7) the device 320 compares the present value of the total print units used (TPUU) 323d to the threshold entries 119b in the stack 119 and sets its current page price ratio (CPPR) value 323b to the PPR 119a corresponding to the highest threshold $TPUU_{TH}$ 119b that is less than or equal to the present TPUU value 323d in the memory 323. In this manner, the device 320 consumes print units using the page price ratio applicable at the time the expended print units were applied to the device 320, and only uses the next subsequent PPR when the TPUU reaches or exceeds the corresponding threshold $TPUU_{TH}$ 119b.

Figure 9:
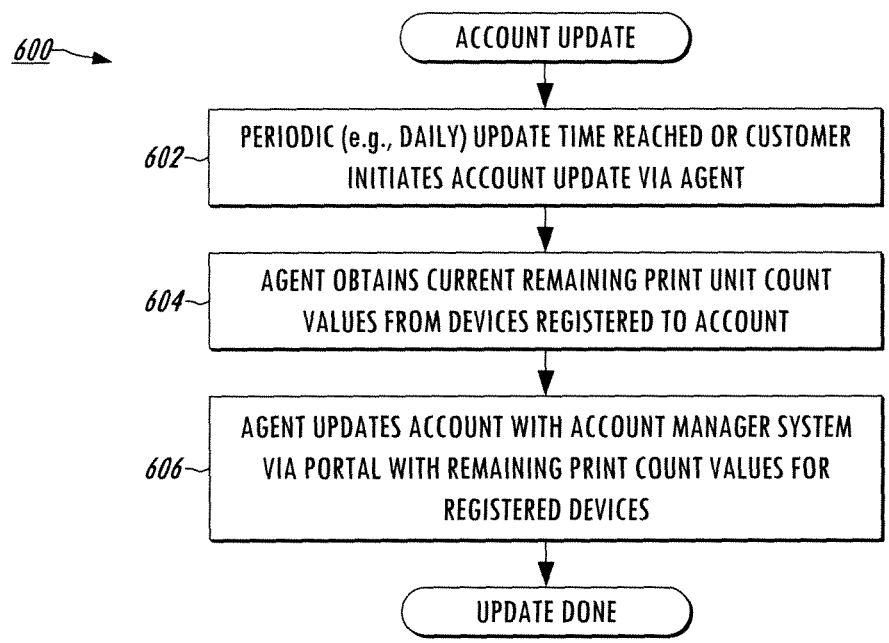
FIG. 9 is a flow diagram illustrating an exemplary process for updating account information in the account manager system of FIG. 1.

Referring also to FIG. 9, the account management component 106 is further operative to update the account information 110 of a customer account via a process 600. In one embodiment, the updating is periodic, such as daily or hourly, although aperiodic updates are possible, such as through customer initiation at any time, and the updates could be initiated based on other criteria, for example, number of prints, credit balance, etc. In practice, the customer agent component 360 can poll devices 320 connected at a given time to the customer network 302 (although the devices 320 need not be connected to the network 302 to perform document processing operations), and to obtain the device account information, and then forward the gathered data, in whole or in part, to the account manager system 104 via the portal 102. At 602 in FIG. 9, an update is initiated by a predefined periodic update time being reached or by initiation from a customer via an agent 360. At 604, the agent 360 obtains current remaining print unit count value information from devices 320 registered to an account, and the agent 360 updates the system 104 with the values and other data via the portal 102 at 606. The account manager system 104 thus receives updated remaining print unit value(s) 115c for one or more document processing device(s) 320 from a customer via the authorized agent 360 and the portal 102, and updates the registered device information 114 of the account information 110 for the specified account for the document processing device 320.

Figure 10:
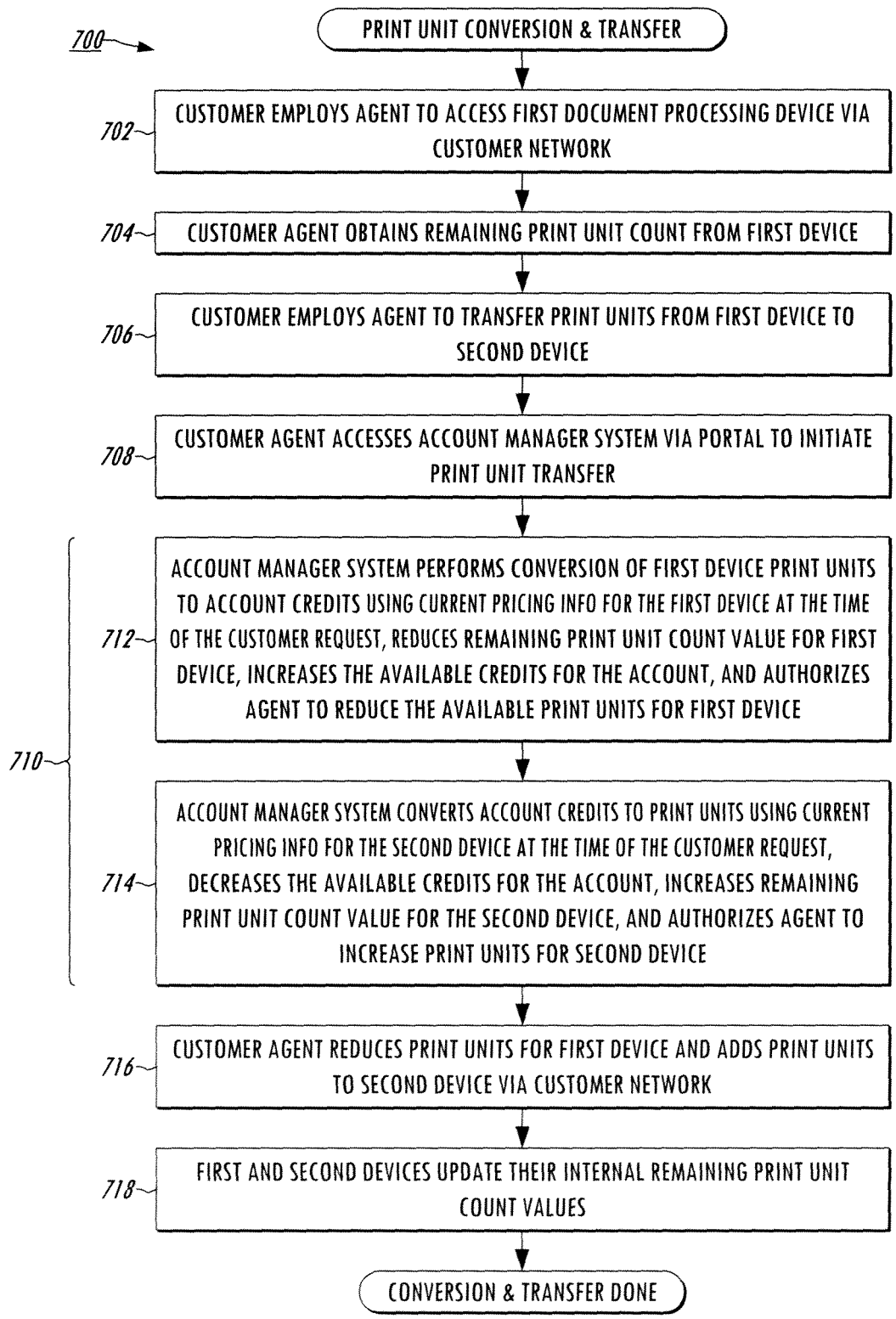
FIG. 10 is a flow diagram illustrating an exemplary process for converting previously applied print units to account credits and for transferring print units from one document processing device to another in a customer account.

Referring also to FIG. 10, a process 700 is illustrated for converting previously applied print units to account credits and for transferring print units from one document processing device 320 to another in a customer account. In one implementation, the account management component 106 directly converts print units from a first device 320 to print units for the second device 320 using the current pricing information associated with those two devices 320, generally as a single transaction from the customer's perspective, with the first device's print unit count 323e, 115c value being reduced and the second device's value 323e, 115c being increased accordingly without modifying the account credit value 111c. Alternatively, a first transaction is used to transfer print units from the first device and convert these into account credits, and then a second transaction converts account credits and applies print units to the second device, where this form of implementation is illustrated in the embodiment of FIG. 10. At 702, the customer employs an agent 360 to access a first device 320 via the customer network 302 and obtains the remaining print unit count from this device at 704. At 706, the customer uses the agent 360 to transfer print units from the first device 320 to a second device 320 registered to the account. At 708, the agent 360 accesses the account manager system 104 via the portal 102 to initiate the print unit transfer. Any number of devices may be involved in print unit or account credit transfers, as example, from one device split for transfer at some desired ratio to two other devices or credits taken from two devices and applied to a third or to the general account so credits may be later allocated to one or more devices as desired.

At 712, the account manager system 104 converts a number of print units previously applied to the specified first device 320 into a number of account credits available to the specified account according to the specified document processing device 320 and the current pricing information 112 for the specified account at the time of the requested transfer, updating the corresponding available account credits and authorizing the agent 360 to reduce the first device's remaining print unit value 323e (an also updating the print unit value 115c in the stored account information 110). At 714, the account manager system 104 applies print units to the specified second device 320 according to the customer request by converting converted account credits into a number of print units for the second device according to the current pricing information for the specified account at the time of the request, and the corresponding values and account data 110 are updated, with the agent 360 being authorized to apply the print units to the second device. At 716, the agent 360 updates the first and second devices 320, and the devices 320 update their internal count values at 718.

Figure 11:
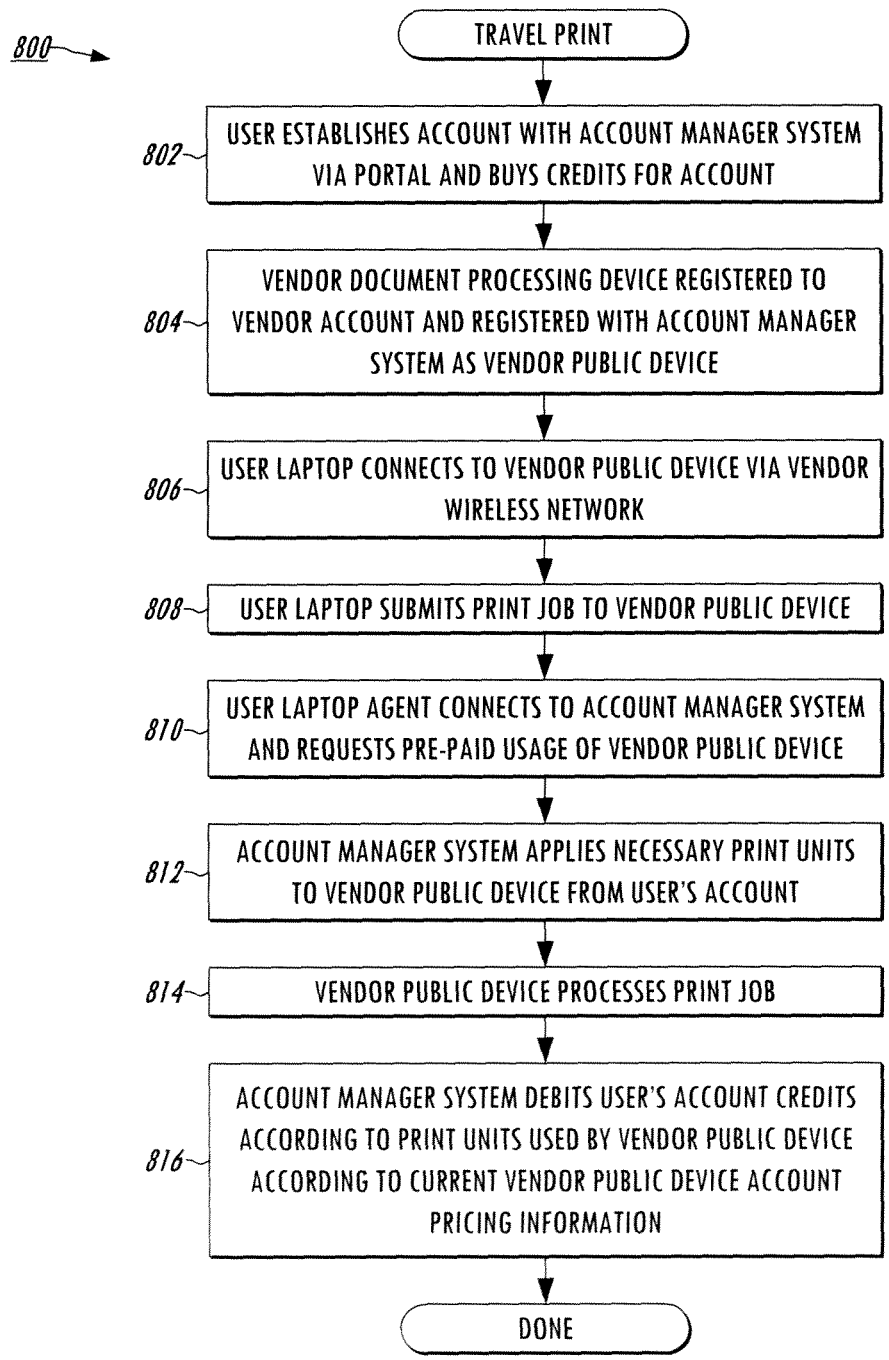
FIG. 11 is a flow diagram illustrating an exemplary process for a user to perform printing operations on a public device registered to a vendor account using credits from the user's account via the account management system and techniques of the disclosure.

Referring also to FIG. 11, an exemplary process 800 is shown for a user to perform printing operations on a public device 320 registered to a vendor account using credits from the user's account via the account management system 104. This process is implemented via the account manager system 104, with the account management component 106 allowing a user at 802 to establish a user account and to add credits to the user account (e.g., 510 in FIG. 8 above) via a user-authorized agent 360 and a portal 102. At 804, a vendor is allowed to register a particular document processing device 320 to a vendor account as a public device 320 via a vendor-authorized agent 360 and the portal 102. The user at 806 connects to the vendor public device 320 via a vendor network. In one situation, the vendor is a print/copy service with a wireless network in their lobby, and with one or more printers, copiers, fax machines, or other document processing devices 320 designated for public use (by registered users) and registered to the vendor's account. A user, such as a business traveler, having a registered user account with the manager system 104 enters the vendor site with a laptop computer, and accesses the vendor's wireless network and discovers one or more printers available to print a job for the user. At 808, the user submits a print job to a selected vendor printer device 320 (a public device), and an agent component 360 on the laptop computer connects to the account manager system 104 via a portal 102 to request usage of the vendor's public device 320.

The account manager system 104 receives the request at 810, and applies available print units at 812 to the public device 320 (associated with the vendor's account) via a vendor-authorized agent 360 operatively coupled with the public device 320, and the manager system 104 converts a number of credits currently available to the user account into a number of print units according to the public device 320 and the current pricing information 112 for the vendor account at the time of the request. The vendor device 320 then prints the user's job at 814, and the account manager system debits the user's account credits at 816 according to the number of print units used by the vendor public device 320, based on the pricing information established in the vendor's account.

The disclosed methods and account manager systems thus facilitate accounting, provisioning, and controlled usage of a variety of different devices 320 associated with an account, allowing pricing for printing, scanning, faxing, support etc. to be tailored according to the type of service or product model, as well as selective inclusion of costs for consumables 322, service, and support according to specific accounts established for different customers, and for different locations or regions, and any other account-specific factors arranged by a manufacturer implementing the account management system 104 and/or by a reseller 200. The architecture, moreover, allows pricing changes to be made easily by simply updating the account credit-to-print unit conversion information (pricing information 112) at the management system data store. The system 104 also facilitates transfers of prepaid print units from one device to another as well as from a device 320 back to a customer account, thereby enhancing a customer's ability to manage printing devices and users. The customer is also able to selectively include various print unit pricing options, including service, consumables, and/or support, which can vary with the device age and the amount of usage within a given time period, thereby providing better adaptability for valued customers. The plan terms and provisions, moreover, are easily altered by changes to the stored account information 110 by agreement with specific customers. The system also allows consumables, such as toner cartridges, to be transferred from one device 320 to another, with the receiving unit reading the consumable identifier (e.g., serial number) and updating the management system account information accordingly. Moreover, the systems and methods disclosed above allow a specific device 320 to operate at predetermined reduced functionality levels if the device print units become depleted, for instance, where the printer is disconnected from the network 302, thereby allowing the customer to maintain operation until more print units can be applied via the account manager system 104.

Figure 12:
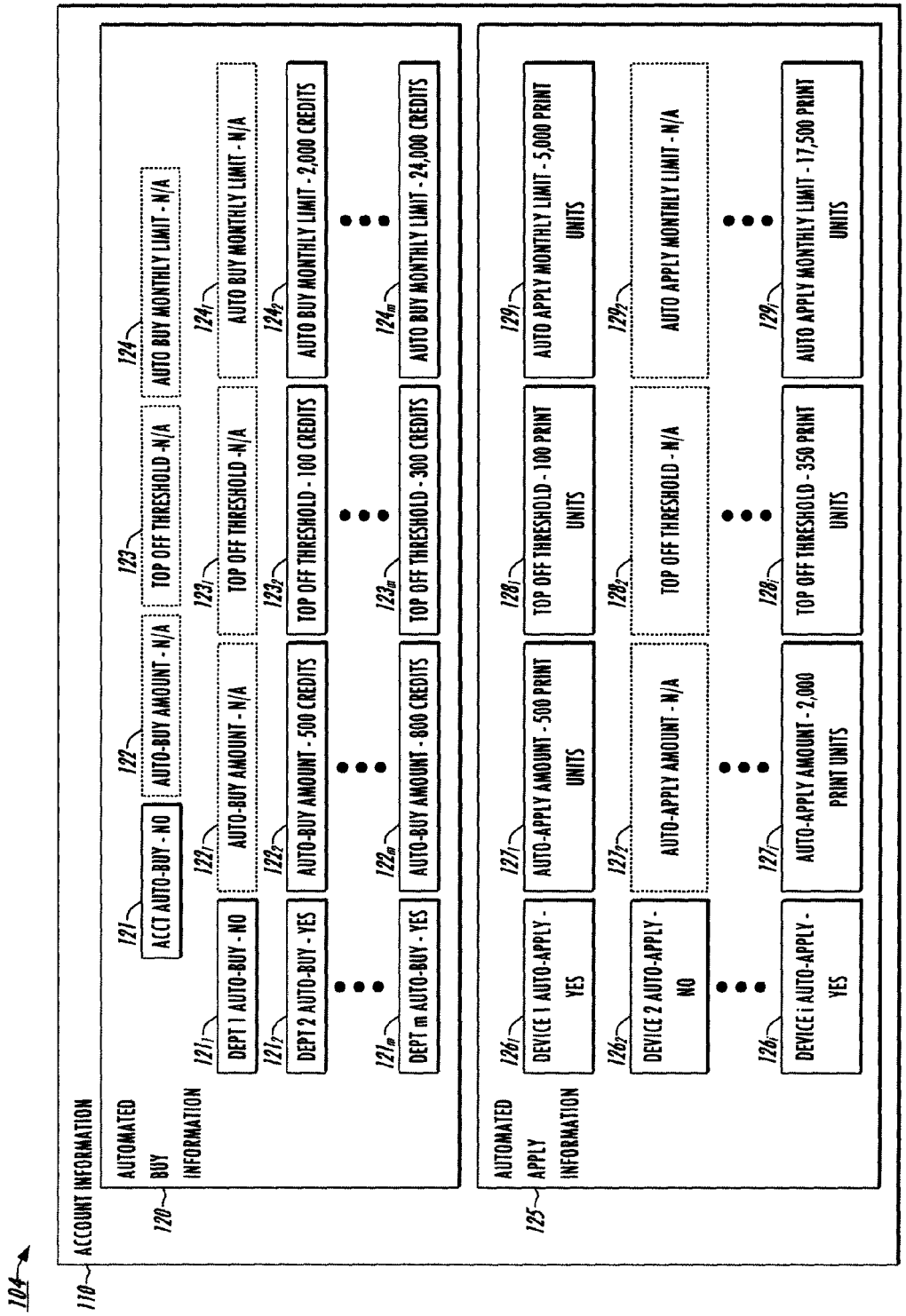
FIG. 12 is a schematic diagram illustrating another embodiment of the account information including automatic buy and automatic apply information stored in the account manager system of FIG. 1.
Figure 13:
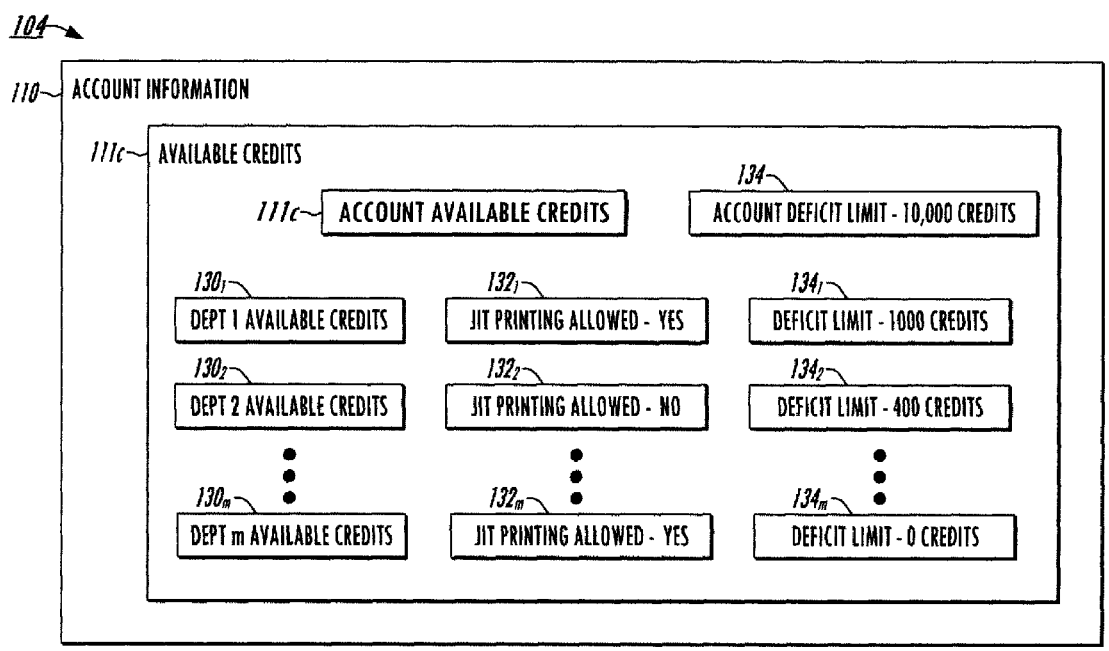
FIG. 13 is a schematic diagram illustrating still another embodiment of the account information including department available credits and deficit limit values, and just-in-time (JIT) indicators stored in the account manager system of FIG. 1.

Referring also to FIGS. 12 and 13, in certain situations a customer may occasionally neglect to reestablish adequate account credits, whereupon a depleted or too low account credit balance (available credits value 111c in FIG. 3) may prevent use of the devices 320 managed by the account manager system 104. FIGS. 12 and 13 illustrate further embodiments of the account information including automatic buy and automatic apply information stored in the account manager system of FIG. 1, as well as department available credits and deficit limit values and just-in-time (JIT) indicators stored in the account manager system 104 of FIG. 1. These features provide customers with automated scheduling tools to implement periodic and/or event-driven transfer of funds into a pre-paid account and subdivisions thereof for departments within a customer account. In this manner, Funds may be committed from a variety of electronic repositories of cash or equivalents based on account initialization or post set up arrangements. The system 104 also allows the customer to pre-designate periodic and/or event-driven print unit application to specified document processing devices 320. The just-in-time parameters allow roaming users to access document processing devices on an as-needed basis, with the customer agent 360 of the user's computer interfacing with the selected device 320 and the account manager system 104 to apply the necessary number of print units to the device 320 for the submitted document processing job. In addition, the account manager system 104 may allow certain customers or departments thereof to continue automatic and/or requested application of print units to device 320 even when a corresponding available credits value 111$c$ has a negative balance (deficit) by providing deficit limits for entire accounts and department-specific deficit limit values 134.

Exemplary automated buy information 120 and automated apply information 125 are shown in FIG. 12 by which an administrator can set and modify the rate of currency conversion from cash (e.g., from a bank or credit account) into a general account, and from there into customer-defined departments. The example of FIG. 12 shows account information 110 for a given account with automatic buy information 120. The information 120 includes an automatic buy enable indicator 121 indicating whether or not automatic buy operations are permitted for the account generally (i.e., whether the system 104 will automatically add new account credits to the available credits value 111$c$ for the general account), as well as a general automatic buy amount value 122, a top-off threshold value 123 and a monthly general account buy limit value 124 that are set by the customer by agreement with the account management system 104. In this regard, the manager 104 may selectively prohibit certain customers from use of the automatic buy features. The automatic buy information 120 in the example of FIG. 12, moreover, includes automatic buy enable indicators 121, automatic buy amount values 122, a top-off buy threshold values 123 and buy limit values 124 specific to "m" different customer departments defined by the customer as being associated with the general account. As shown in FIG. 2, for example, the customer can define two or more logical device groups 310$a$ and 310$b$, referred to herein as 'departments', each including one or more member computing devices 330 and each having one or more participating document processing devices 320 registered to the account. In general operation, user computers identified by the customer as being members of a given department 310 will be able to use the document processing devices 320 of the department without requiring an agent 360 (subject to customer definable restrictions), whereas non-member computers 330 will generally not be able to use department devices 320 with the exception of non-member computers 330 equipped with the below-described agent 360 implementing just-in-time (JIT) functions.

As further shown in FIG. 12, the account information 110 may also include automated apply information 125 for "I" devices 320 registered to the account. In the illustrated embodiment, the automated apply information (125) for each such device 320 includes an auto-apply enable indicator 126 having a value of YES or NO indicating whether the customer has designated that device as participating in the periodic and/or event-driven automated application of print units, an automatic apply amount value 127 indicating a number of print units to be automatically applied to the device 320, an apply threshold value 128 indicating an amount of print units at which further print units are to be automatically applied to a specified document processing device 320, and an apply limit value 129 indicating a maximum number of print units to be automatically applied in a predefined length of time, such as a month in the illustrated example.

FIG. 13 illustrates further aspects of an embodiment of the account information 110 in which the available credits information 11$c$ includes a general value 111$c$ indicating the credits currently available to the general customer account, and a general account credit deficit limit 134 indicating a predetermined negative limit to the available credits value 111$c$ to allow the customer to continue drawing account credits for print unit application even when the value 111$c$ is zero or negative. In this embodiment, moreover, the "m" departments of the account individually include available credits values 131 and deficit limits 134, along with indicators 132 indicating whether the customer has authorized the corresponding document processing device 320 for JIT operation as described further below.

An additional aspect of the disclosure is the availability of the customer specific pricing information 112$b$ in FIG. 3 above, including pricing specifics for print unit application and credit buying as influenced by time-based, geographic region and/or other market parameters which are utilized in the automatic buy and application features, where various cash equivalents that may be utilized to perform automatic pre payment into the Pre-Pay account are established in some embodiments via customer-specific agreements with the account management system 104. Examples of such agreements may include program arrangements, such as duration and how to handle credit balances at the normal conclusion of scheduled contract end period or cancellation prior to that time. Other arrangements may include nominal credits applied to the account and the schedule for those payments as well as how to handle deviations such as credit amounts that may be needed between scheduled payments or reducing a nominal payment if the preceding period reflects usage less than typically provided for, yielding a high credit balance not needing supplementation, eligibility for and specific values of deficit limits 134, etc.

In operation, the account manager system 104 stores the information 110 in the data store and the account management component 106 automatically adds a number of credits corresponding to the automatic buy amount 122 for a given account or department thereof according to the automated buy information 120 at a current rate and adds a corresponding number of credits to the available credits value 111$c$ for the given account and/or to the available credits for the corresponding account departments. In addition, the account management component 106 operates (e.g., as described at 510 in FIG. 8 above) upon a customer request to add credits to the account. The account management component 106 in this embodiment also operates to automatically apply a number of print units (e.g., 520 in FIG. 8 above) corresponding to the automatic apply amount 127 in the automated apply information 120 to the corresponding document processing device(s) 320 specified in the automated apply information 120 by converting a number of credits currently available to the general or department account to which the device 320 is registered into a number of print units according to the specified document processing device 320 and the current pricing information 112 for the specified account at a second predetermined time. In addition, the application of print units can be request-driven as described above. This allows a customer administrator to decide to spend $500 a month, for example, and to automatically put $500 in the buy account on the first of each month, and to schedule five different devices 320 to which $100 are applied on the second of each month.

Moreover, the top-off threshold values for credit purchases (123) and print unit applications (128) are managed by the account manager system 104 such that if the available account/department credits or device print units fall below the specified threshold amount, an event-driven buy or apply operation will be undertaken by the account management component 106. Moreover, the automatic buy and automatic apply operations are limited by the specified auto buy and auto-apply limits 124 and 129, respectively. In one example, a top off buy threshold value $123_2$ can be set to 100 such that whenever the department account balance goes down to 100 credits, the account manager system 104 automatically 'buys' another 500 credits and updates the available credits value $130_2$ (FIG. 13) accordingly. Similarly, the automated apply information 125 for device "i" in FIG. 12 is set by the customer so that anytime the device 320 reaches 350 print units, another 2,000 print units will be automatically applied to the device 320 by the account manager 104. In this example, automated application of print units to the device 320 will cease at the specified 17,500 print unit limit $129_i$ in any given month (FIG. 12), and no more than 2,000 department credits will be added to the second department in a month's time per the limit $124_2$. In this manner, the customer can utilize automated buy and/or apply transactions within the pre-designated limits 124, 129, alone or in combination with the above-described request-based credit buy and print unit apply capabilities offered by the account manager system 104.

As noted above, the account information 110 in the example of FIG. 13 also includes a general account deficit limit amount 134 indicating a predetermined negative limit to the available credits value 111*c*. In this embodiment, the account manager system 104 automatically adds credits from the general account to account departments 310 and automatically applies print units to devices 320 so as to avoid exceeding the deficit limit amount 134 for the account. In addition, the account information 110 for this account includes department deficit limit amounts 134 indicating a predetermined negative limit to the corresponding department available credits values 130, and wherein automatically applying 520 a number of print units is done so as to avoid exceeding the department deficit limit amounts 134.

Figure 14:
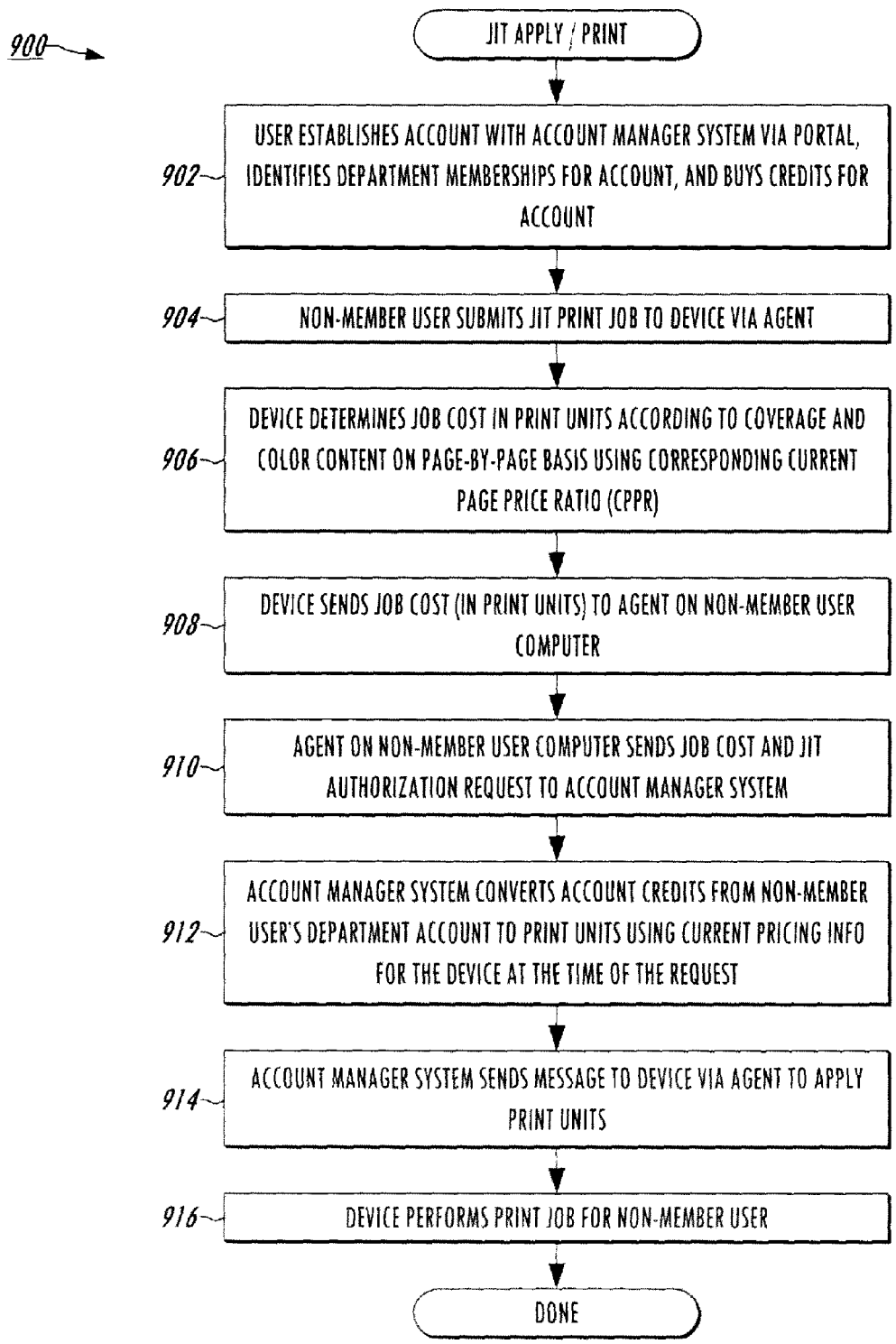
FIG. 14 is a flow diagram illustrating an exemplary process for just-in-time (JIT) printing using a customer agent and the account manager system of FIG. 1.

Referring also to FIG. 14, an exemplary process 900 is illustrated for just-in-time (JIT) printing using a customer agent 360 of a non-member computer 330 in conjunction with the account manager system 104 to allow non-member users to access a department document processing device 320. General usage restrictions with respect to supplies and equipment are implemented by configurable operation mode selections provided by the device 320 and may include color vs. mono page type, time of day restrictions or job size restrictions. Additionally, each user may be required to input a PIN to enable certain functionality. An administrator authorization code might allow override of function restrictions or reprogramming usage limits. In addition, devices in different departments 310 may be set up differently, adding to the difficulty of coordinating selective use and tracking cost by budget center. Accordingly, the present disclosure allows user account administration and control over use and cost tracking associated with devices 320 in a department group 310, independent of device location. In one embodiment, each department 310 and members thereof may be given an account access code that enables pre defined functionality by entity for each registered device 320, and apportionment of account credit may be made by pre-defined budget allocation or by direct department contribution to the account credit balance.

Selective transfer of credits from one department budget center to multiple users and/or departments may be made by an authorized account control agent. In the event of a low account balance, particularly as allocated to the site or device 320 requiring a credit amount greater than the current balance for a job in process, there may be general account credit transfer (apply operation via the account manager system 104 and the portal 102) to enable job continuation when multiple accounts exist across departments. Limited use/limited functionality may be enabled for non account members, referred to herein as JIT printing. Moreover, as described above, account credit transfers from the general customer account can be based on predefined rules via the automated buy information 120, for example, a local control agent 360 and various authorizations for managing aspects of the account may be set up exclusively by the customer or, if so selected by the customer, to be worked out in cooperation with the account management system provider and administered by the provider. Exemplary provisions may include use of units registered to the account by non-account members provided their contributions to running cost are in some way accommodated or compensated by the account holder. Account credits or allocated credit amounts may be downloaded to the individual devices 320 via print unit apply operations to allow for operation when not connected to a customer network 302. Alternatively or in combination, real time debit and credit status changes to the general account balance may be tracked by a local connected computer 330 equipped with an agent 360. In one embodiment, currency conversion occurs immediately when adding credit to the general account balance or transferring allocated credit information to a local interface computer 330 or device 320. Individual use centers may arrange for alternative currency conversions by site, department or device 320.

In some embodiments, accounts with high trust level, such as close relationships with long time customers, may be set up so that individual devices 320 are authorized to continue functioning when an account balance or unit allocation balance reaches zero. Debit tracking enables the account to be caught up when additional credit payment is made via a subsequent apply operation. When such high level trust is not established, selective functionality may be enabled at some limited level, based on such job aspects as size (A4 vs. A3), monochrome only printing, number of jobs or pages or the like. Imaging job information, including user and device name or S/N can be logged and tracked concurrent with security and use restriction control. Notices of credit balance, service requirements and the like may be displayed on the device 320 and an administrator computer 330 via an agent 360 to prompt appropriate action. Account status may be presented on the display panel of the devices 320 and/or computers 330 networked to communicate with the devices 320 when account status changes or as desired for an update. Status of account information may also be set up to be printed out on demand.

FIG. 14 is a flow diagram illustrating an exemplary process for just-in-time (JIT) printing using a customer agent 360 of a non-member computer 330 and the account manager system of FIG. 1. As an illustrative example, a laptop computer 330*d* having an agent 360 in FIG. 2 above may migrate to a wireless connection to a printer device 320*j*, where the user of the computer 330*d* is not a designated member of the department 310*b* to which the printer 320*j* is registered with the account manager system 104. In this situation, the computer 330*d* selects the printer 320*j* for submission of a print job, but is not allowed to expend print units previously applied to that printer 320*j* by the department to which the device 320*j* belongs. In order to facilitate prepaid usage of the device 320*j*, the method 900 includes establishment of an account at 302 (or association of the non-member computer 330*d* with a department account via the agent 360 and the portal 102, with sufficient credits being bought (or pre-existing) in the account (general or department account different from the account to which the printer 320*j* is registered) with which the roaming computer 330*d* is associated. At 904, the non-member user submits a JIT print job to the selected device 320*j*, and the device 320 determines a job cost at 906 according to the coverage and color content on a page-by-page basis using a corresponding CPPR (e.g., as described above at 406 in FIG. 3). The device 320*j* sends the JIT job cost (in terms of print units) at 908 to the agent 360 of the non-member user computer 330*d*, which is received by the agent 360. At 910, the non-member's agent 360 sends an authorization request including the job cost to an account manager system 104 via the network 302 and the portal 102. The account manager system 104 receives the request at 912 and converts account credits from the non-member's department (or general) account into print units for the device 320*j* using the current pricing information 112 for the device 320*j* at the time of the request, where the pricing information 112 may include surcharges or different rates for JIT usage. At 914, the account manager system 104 sends a message to the non-member's agent 360, which then forwards an authorization message from the account manager system 104 to the device 320*j* to apply a number of print units to the device 320 corresponding to the job cost value and to authorize the device 320 to perform the JIT document processing job at 916.

In accordance with further aspects of the present disclosure, a computer readable medium or media is provided, such as a computer memory, a memory within the server 100 or other computer-accessible memory such as a CD-ROM, floppy disk, flash drive, database, server, computer, etc. which has computer executable instructions for performing one or more of the processes disclosed above.

The above described examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software or firmware, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A method for managing prepaid usage of at least one document processing device configured to allow customer initiated operation based on available print units applied to the device, the method comprising:

storing account information in a data store for a plurality of accounts, the individual accounts being associated with a corresponding customer, the account information for individual accounts comprising:
  an available credits value indicating an amount of account credits currently available to the account,
  current pricing information including at least one conversion factor for converting account credits available to the account to print units for specific document processing devices registered to the account,
  automated buy information including an automatic buy amount of account credits authorized by a customer to be purchased automatically, and
  automated apply information including an automatic apply amount of print units to be automatically applied to a specified document processing device registered to the account;
using a computer processor at a first predetermined time, automatically adding a number of credits corresponding to the automatic buy amount in the automated buy information to a given account at a current rate and adding a corresponding number of credits to the available credits value for the given account;
  wherein the automated buy information for a given account includes a buy threshold value indicating an amount of account credits at which further credits are to be automatically added:
  further comprising using the computer processor, when the available credits value for the given account is at or below the buy threshold value, automatically adding a number of credits corresponding to the automatic buy amount in the automated buy information to a given account at a current rate and adding a corresponding number of credits to the available credits value for the given account,
  wherein the automated buy information for a given account includes a buy limit value indicating a maximum number of account credits to be automatically purchased in a first predefined length of time, and
  wherein automatically adding credits to a given account is done so as to avoid adding credits in excess of the buy limit value within the first predefined length of time and
using the computer processor at a second predetermined time, automatically applying a number of print units corresponding to the automatic apply amount in the automated apply information to a document processing device specified in the automated apply information by converting a number of credits currently available to the account to which the device is registered into a number of print units according to the specified document processing device and the current pricing information for the specified account at the second predetermined time;
  wherein the automated apply information includes an apply limit value indicating a maximum number of print units to be automatically applied in a second predefined length of time; and wherein automatically applying a number of print units to a given document processing device is done so as to avoid applying print units in excess of the apply limit value within the second predefined length of time.

2. The method of claim 1:
wherein the account information for at least one account comprises a plurality of department available credits values indicating an amount of account credits currently available to corresponding predefined customer departments;
wherein the automated buy information for the at least one account includes:
a plurality of department automatic buy amounts corresponding to the customer departments,
a plurality of department buy threshold values corresponding to the customer departments, and
a plurality of department buy limit values corresponding to the customer departments; further comprising:
using the computer processor at the first predetermined time, automatically adding a number of credits corresponding to the department automatic buy amount in the automated buy information to a given account department at a current rate and adding a corresponding number of credits to the department available credits value for the given account department without exceeding the department buy limit value within the first predefined length of time; and
using the computer processor, when the department available credits value for the given account department is at or below the corresponding department buy threshold value, automatically adding a number of credits corresponding to the department automatic buy amount in the automated buy information to the given account department at a current rate and adding a corresponding number of credits to the department available credits value for the given account department without exceeding the department buy limit value within the first predefined length of time.

3. The method of claim 2, wherein the account information for individual accounts comprises a deficit limit amount indicating a predetermined negative limit to the available credits value; and wherein automatically adding credits to an account department and automatically applying a number of print units are done so as to avoid exceeding the deficit limit amount for a given account.

4. The method of claim 3, wherein the account information for at least one account comprises a plurality of department deficit limit amounts indicating a predetermined negative limit to the corresponding department available credits values, and wherein automatically applying a number of print units is done so as to avoid exceeding the department deficit limit amounts.

5. The method of claim 3, further comprising upon a request from a customer of a specified account via a portal, using the computer processor, adding credits to the specified account at a current rate and adding a number corresponding to a paid amount of new credits to the available credits value for the specified account if customer payment is verified; and upon a request from the customer of the specified account via the portal, using the computer processor, applying print units to a specified document processing device associated with the specified account by converting a number of credits currently available to the specified account into a number of print units according to the specified document processing device and the current pricing information for the specified account at the time of the request.

6. The method of claim 1, wherein the account information for individual accounts comprises a deficit limit amount indicating a predetermined negative limit to the available credits value; and wherein automatically adding credits to an account department and automatically applying a number of print units are done so as to avoid exceeding the deficit limit amount for a given account.

7. The method of claim 1, further comprising upon a request from a customer of a specified account via a portal, using the computer processor, adding credits to the specified account at a current rate and adding a number corresponding to a paid amount of new credits to the available credits value for the specified account if customer payment is verified; and upon a request from the customer of the specified account via the portal, using the computer processor, applying print units to a specified document processing device associated with the specified account by converting a number of credits currently available to the specified account into a number of print units according to the specified document processing device and the current pricing information for the specified account at the time of the request.

8. The method of claim 3, further comprising storing registered device information including device subaccount information for at least one device subaccount associated with a particular document processing device registered by the customer to the account, wherein the device subaccount information for the at least one device subaccount includes a device remaining print units value;
wherein the automated apply information includes an apply threshold value indicating an amount of print units at which further print units are to be automatically applied to a specified document processing device registered to the account;
the method further comprising using the computer processor, when the device remaining print units value for a given device is at or below the corresponding apply threshold value, automatically applying a number of print units corresponding to the automatic apply amount in the automated apply information to the given document processing device by converting a number of credits currently available to the account to which the device is registered into a number of print units according to the specified document processing device and the current pricing information for the specified account.

9. A method for managing prepaid usage of at least one document processing device configured to allow customer initiated operation based on available print units applied to the device, the method comprising:
storing account information in a data store for a plurality of accounts, the individual accounts being associated with a corresponding customer, the account information for individual accounts comprising:
an available credits value indicating an amount of account credits currently available to the account,
current pricing information including at least one conversion factor for converting account credits available to the account to print units for specific document processing devices registered to the account,
automated buy information including an automatic buy amount of account credits authorized by a customer to be purchased automatically, and
automated apply information including an automatic apply amount of print units to be automatically applied to a specified document processing device registered to the account;
using a computer processor at a first predetermined time, automatically adding a number of credits corresponding to the automatic buy amount in the automated buy information to a given account at a current rate and adding a corresponding number of credits to the available credits value for the given account; and using the computer processor at a second predetermined time, automatically applying a number of print units corresponding to the automatic apply amount in the automated apply information to a document processing device specified in the automated apply information by converting a number of credits currently available to the account to which the device is registered into a number of print units according to the specified document processing device and the current pricing information for the specified account at the second predetermined time;

wherein the automated buy information for a given account includes a buy threshold value indicating an amount of account credits at which further credits are to be automatically added;

further comprising using the computer processor, when the available credits value for the given account is at or below the buy threshold value, automatically adding a number of credits corresponding to the automatic buy amount in the automated buy information to a given account at a current rate and adding a corresponding number of credits to the available credits value for the given account;

wherein the automated buy information for a given account includes a buy limit value indicating a maximum number of account credits to be automatically purchased in a first predefined length of time; and wherein automatically adding credits to a given account is done so as to avoid adding credits in excess of the buy limit value within the first predefined length of time;

wherein the account information for individual accounts comprises a deficit limit amount indicating a predetermined negative limit to the available credits value; and wherein automatically adding credits to an account department and automatically applying a number of print units are done so as to avoid exceeding the deficit limit amount for a given account.

10. The method of claim 9:

wherein the account information for at least one account comprises a plurality of department available credits values indicating an amount of account credits currently available to corresponding predefined customer departments;

wherein the automated buy information for the at least one account includes:
a plurality of department automatic buy amounts corresponding to the customer departments,
a plurality of department buy threshold values corresponding to the customer departments, and
a plurality of department buy limit values corresponding to the customer departments; further comprising:

using the computer processor at the first predetermined time, automatically adding a number of credits corresponding to the department automatic buy amount in the automated buy information to a given account department at a current rate and adding a corresponding number of credits to the department available credits value for the given account department without exceeding the department buy limit value within the first predefined length of time; and using the computer processor, when the department available credits value for the given account department is at or below the corresponding department buy threshold value, automatically adding a number of credits corresponding to the department automatic buy amount in the automated buy information to the given account department at a current rate and adding a corresponding number of credits to the department available credits value for the given account department without exceeding the department buy limit value within the first predefined length of time.

11. The method of claim 9, wherein the account information for at least one account comprises a plurality of department deficit limit amounts indicating a predetermined negative limit to the corresponding department available credits values, and wherein automatically applying a number of print units is done so as to avoid exceeding the department deficit limit amounts.

12. The method of claim 9, further comprising:

upon a request from a customer of a specified account via a portal, using the computer processor, adding credits to the specified account at a current rate and adding a number corresponding to a paid amount of new credits to the available credits value for the specified account if customer payment is verified; and upon a request from the customer of the specified account via the portal, using the computer processor, applying print units to a specified document processing device associated with the specified account by converting a number of credits currently available to the specified account into a number of print units according to the specified document processing device and the current pricing information for the specified account at the time of the request.

13. The method of claim 9 wherein the automated apply information includes an apply limit value indicating a maximum number of print units to be automatically applied in a second predefined length of time; and wherein automatically applying a number of print units to a given document processing device is done so as to avoid applying print units in excess of the apply limit value within the second predefined length of time.

14. A method for managing prepaid usage of at least one document processing device configured to allow customer initiated operation based on available print units applied to the device, the method comprising:

storing account information in a data store for a plurality of accounts, the individual accounts being associated with a corresponding customer, the account information for individual accounts comprising:
an available credits value indicating an amount of account credits currently available to the account,
current pricing information including at least one conversion factor for converting account credits available to the account to print units for specific document processing devices registered to the account,
automated buy information including an automatic buy amount of account credits authorized by a customer to be purchased automatically, and
automated apply information including an automatic apply amount of print units to be automatically applied to a specified document processing device registered to the account;

using a computer processor at a first predetermined time, automatically adding a number of credits corresponding to the automatic buy amount in the automated buy information to a given account at a current rate and adding a corresponding number of credits to the available credits value for the given account; and using the computer processor at a second predetermined time, automatically applying a number of print units corresponding to the automatic apply amount in the automated apply information to a document processing device specified in the automated apply information by converting a number of credits currently available to the account to which the device is registered into a number of print units according to the specified document processing device and the current pricing information for the specified account at the second predetermined time;

wherein the automated buy information for a given account includes a buy threshold value indicating an amount of account credits at which further credits are to be automatically added;

further comprising using the computer processor, when the available credits value for the given account is at or below the buy threshold value, automatically adding a number of credits corresponding to the automatic buy amount in the automated buy information to a given account at a current rate and adding a corresponding number of credits to the available credits value for the given account;

wherein the automated buy information for a given account includes a buy limit value indicating a maximum number of account credits to be automatically purchased in a first predefined length of time; and wherein automatically adding credits to a given account is done so as to avoid adding credits in excess of the buy limit value within the first predefined length of time;

further comprising storing registered device information including device subaccount information for at least one device subaccount associated with a particular document processing device registered by the customer to the account, wherein the device subaccount information for the at least one device subaccount includes a device remaining print units value;

wherein the automated apply information includes an apply threshold value indicating an amount of print units at which further print units are to be automatically applied to a specified document processing device registered to the account;

the method further comprising using the computer processor, when the device remaining print units value for a given device is at or below the corresponding apply threshold value, automatically applying a number of print units corresponding to the automatic apply amount in the automated apply information to the given document processing device by converting a number of credits currently available to the account to which the device is registered into a number of print units according to the specified document processing device and the current pricing information for the specified account.

15. The method of claim 14, wherein the automated apply information includes an apply limit value indicating a maximum number of print units to be automatically applied in a second predefined length of time; and wherein automatically applying a number of print units to a given document processing device is done so as to avoid applying print units in excess of the apply limit value within the second predefined length of time.

16. The method of claim 14, wherein the account information for at least one account comprises a plurality of department deficit limit amounts indicating a predetermined negative limit to the corresponding department available credits values, and wherein automatically applying a number of print units is done so as to avoid exceeding the department deficit limit amounts.

17. The method of claim 14, further comprising:
upon a request from a customer of a specified account via a portal, using the computer processor, adding credits to the specified account at a current rate and adding a number corresponding to a paid amount of new credits to the available credits value for the specified account if customer payment is verified; and upon a request from the customer of the specified account via the portal, using the computer processor, applying print units to a specified document processing device associated with the specified account by converting a number of credits currently available to the specified account into a number of print units according to the specified document processing device and the current pricing information for the specified account at the time of the request.

18. The method of claim 14:
wherein the account information for at least one account comprises a plurality of department available credits values indicating an amount of account credits currently available to corresponding predefined customer departments;

wherein the automated buy information for the at least one account includes:
a plurality of department automatic buy amounts corresponding to the customer departments,
a plurality of department buy threshold values corresponding to the customer departments, and
a plurality of department buy limit values corresponding to the customer departments; further comprising:

using the computer processor at the first predetermined time, automatically adding a number of credits corresponding to the department automatic buy amount in the automated buy information to a given account department at a current rate and adding a corresponding number of credits to the department available credits value for the given account department without exceeding the department buy limit value within the first predefined length of time; and using the computer processor, when the department available credits value for the given account department is at or below the corresponding department buy threshold value, automatically adding a number of credits corresponding to the department automatic buy amount in the automated buy information to the given account department at a current rate and adding a corresponding number of credits to the department available credits value for the given account department without exceeding the department buy limit value within the first predefined length of time.

19. The method of claim 18, wherein the account information for individual accounts comprises a deficit limit amount indicating a predetermined negative limit to the available credits value; and wherein automatically adding credits to an account department and automatically applying a number of print units are done so as to avoid exceeding the deficit limit amount for a given account.

20. An account manager system for managing prepaid usage of at least one document processing device configured to allow customer initiated operation based on available print units applied to the device, the system comprising:
a server operatively coupled with a network to communicate and exchange data with one or more customer networks;
a data store operatively coupled with the server to store account information for a plurality of accounts, the individual accounts being associated with a corresponding customer, the account information for individual accounts comprising:
an available credits value indicating an amount of account credits currently available to the account, current pricing information including at least one conversion factor for converting account credits available to the account to print units for specific document processing devices registered to the account, a deficit limit amount indicating a predetermined negative limit to the available credits value, wherein automatically adding credits to an account department and automatically applying a number of print units are done so as to avoid exceeding the deficit limit amount for a given account, automated buy information including an automatic buy amount of account credits authorized by a customer to be purchased automatically, and automated apply information including an automatic apply amount of print units to be automatically applied to a specified document processing device registered to the account;

an account management component operatively coupled with the data store and the server to automatically add a number of credits corresponding to the automatic buy amount in the automated buy information to a given account at a current rate and adding a corresponding number of credits to the available credits value for the given account;

the account management component being further operative to automatically apply a number of print units corresponding to the automatic apply amount in the automated apply information to a document processing device specified in the automated apply information by converting a number of credits currently available to the account to which the device is registered into a number of print units according to the specified document processing device and the current pricing information for the specified account at the second predetermined time;

the account management component being further operative to add, upon a request from a customer of a specified account via a portal, credits to the specified account at a current rate and to add a number corresponding to a paid amount of new credits to the available credits value for the specified account if customer payment is verified; and the account management component being further operative upon a request from the customer of the specified account via the portal, to apply print units to a specified document processing device associated with the specified account by converting a number of credits currently available to the specified account into a number of print units according to the specified document processing device and the current pricing information for the specified account at the time of the request.

* * * * *